(12) United States Patent
Li

(10) Patent No.: US 7,452,086 B2
(45) Date of Patent: Nov. 18, 2008

(54) LIGHT PIPE BASED PROJECTION ENGINE

(75) Inventor: Kenneth K. Li, Arcadia, CA (US)

(73) Assignee: Wavien, Inc., Valencia, CA (US)

( * ) Notice: Subject to any disclaimer, the term of this patent is extended or adjusted under 35 U.S.C. 154(b) by 0 days.

(21) Appl. No.: 11/701,871

(22) Filed: Feb. 2, 2007

(65) Prior Publication Data

US 2007/0247694 A1    Oct. 25, 2007

Related U.S. Application Data

(62) Division of application No. 10/863,588, filed on Jun. 9, 2004, now Pat. No. 7,172,290.

(60) Provisional application No. 60/527,006, filed on Dec. 5, 2003, provisional application No. 60/489,104, filed on Jul. 23, 2003, provisional application No. 60/485,736, filed on Jul. 10, 2003, provisional application No. 60/479,730, filed on Jun. 20, 2003, provisional application No. 60/476,612, filed on Jun. 9, 2003.

(51) Int. Cl.
*G03B 21/14* (2006.01)
(52) U.S. Cl. .................. 353/98; 353/20; 353/31
(58) Field of Classification Search ............. 353/20, 353/31, 34, 3, 37, 98
See application file for complete search history.

(56) References Cited

U.S. PATENT DOCUMENTS

| 4,173,412 | A |   | 11/1979 | Ramsay et al. |
|---|---|---|---|---|
| 4,850,685 | A |   | 7/1989 | Kamakura et al. |
| 4,943,154 | A |   | 7/1990 | Miyatake et al. |
| 5,097,323 | A |   | 3/1992 | Sato et al. |
| 5,122,895 | A | * | 6/1992 | Takanashi et al. ........... 359/247 |
| 5,301,030 | A |   | 4/1994 | Ko |
| 5,303,083 | A |   | 4/1994 | Blanchard et al. |
| 5,513,023 | A |   | 4/1996 | Fritz et al. |
| 5,625,738 | A | * | 4/1997 | Magarill ................. 385/146 |
| 5,712,694 | A |   | 1/1998 | Taira et al. |
| 5,751,480 | A |   | 5/1998 | Kitagishi |
| 5,786,873 | A |   | 7/1998 | Chiu et al. |
| 5,884,991 | A | * | 3/1999 | Levis et al. ............... 353/122 |
| 6,053,615 | A |   | 4/2000 | Peterson et al. |
| 6,104,454 | A |   | 8/2000 | Hiyama et al. |
| 6,120,152 | A |   | 9/2000 | Nakayama et al. |

(Continued)

FOREIGN PATENT DOCUMENTS

CA    2290860    5/2000

(Continued)

*Primary Examiner*—William C. Dowling
(74) *Attorney, Agent, or Firm*—Fulbright & Jaworski LLP

(57) ABSTRACT

A light pipe based projection engine includes a X-prism transmitting substantially light of a useful polarization in an output direction and reflecting substantially light of a non-useful polarization in a first orthogonal direction substantially orthogonal to the output direction. An initial reflector may reflect the non-said low, said medium, and said high bands of wavelengths in a second orthogonal direction substantially orthogonal to the output direction and the first orthogonal direction, and a final reflector may reflect the non-said low, said medium, and said high bands of wavelengths in the output direction. The non-said low, said medium, and said high bands of wavelengths may be rotated substantially to light of the useful polarization by the initial and final reflectors.

4 Claims, 23 Drawing Sheets

U.S. PATENT DOCUMENTS

| | | |
|---|---|---|
| 6,139,157 A | 10/2000 | Okuyuma |
| 6,247,814 B1 | 6/2001 | Lin |
| 6,398,389 B1 | 6/2002 | Bohler et al. |
| 6,431,709 B1 | 8/2002 | Tiao et al. |
| 6,587,269 B2 * | 7/2003 | Li ............................... 359/497 |
| 6,672,724 B1 * | 1/2004 | Peterson et al. ............... 353/81 |
| 6,982,830 B2 * | 1/2006 | Li ............................... 359/496 |
| 7,002,745 B2 * | 2/2006 | Li ............................... 359/496 |
| 7,092,159 B2 * | 8/2006 | Li ............................... 359/496 |
| 7,130,122 B2 * | 10/2006 | Li ............................... 359/496 |
| 7,237,900 B2 * | 7/2007 | Peng et al. .................... 353/20 |
| 2002/0135874 A1 * | 9/2002 | Li ............................... 359/497 |
| 2003/0112611 A1 | 6/2003 | Janssen |
| 2003/0223237 A1 | 12/2003 | Janssen |
| 2003/0231262 A1 * | 12/2003 | Janssen ......................... 349/5 |
| 2005/0174641 A1 * | 8/2005 | Greenberg et al. .......... 359/486 |

FOREIGN PATENT DOCUMENTS

| | | |
|---|---|---|
| EP | 584 802 A1 | 3/1994 |
| EP | 0 691 552 A2 | 1/1996 |
| JP | 9/326205 | 12/1997 |
| WO | WO-93/24857 A1 | 12/1993 |
| WO | WO-95/27919 A2 | 10/1995 |

* cited by examiner

LIGHT PIPE BASED PROJECTION ENGINE

CROSS-REFERENCE TO RELATED APPLICATIONS

This application is a divisional of application Ser. No. 10/863,588 filed Jun. 9, 2004, now U.S. Pat. No. 7,172,290, which claims priority to Provisional Application Ser. No. 60/476,612, filed Jun. 9, 2003, No. 60/479,730, filed Jun. 20, 2003, No. 60/485,736, filed Jul. 10, 2003, No. 60/489,104, filed Jul. 23, 2003, and No. 60/527,006, filed Dec. 5, 2003, the disclosures of which are incorporated by reference.

BACKGROUND OF THE INVENTION

1. Field of Invention

In several embodiments, the invention relates to a light pipe based color splitting and guiding system in which incoming broad spectrum light is split into its component colors and guided to the individual imagers through a series of light pipes, beam splitters, and prisms.

2. Description of the Related Art

Projection displays work by projecting light onto a screen. The light is arranged in patterns of colors or brightness and darkness or both. The patterns are viewed by a viewer who assimilates them by associating the patterns with images with which the viewer may already be familiar, such as characters or faces. The patterns may be formed in various ways. One way to form patterns is by modulating a beam of light with a signal representative of a stream of information.

Polarized light may be modulated by filtering it with polarized filters. Polarized filters will pass light, in general, if their polarization matches the polarization of incident light, and reject it if their polarization conflicts with the polarization of incident light. A liquid crystal display (LCD) imager is an example of a polarized filter that may be used in LCD-type projection displays in this way. The LCD imager may include pixels that are modulated by altering their polarization to either match or differ from the polarization of incident light. The light input to the LCD imager is also polarized such that when the polarization of selected pixels differs from that of the input light, the selected pixels will be darkened. The pattern of unchanged and darkened pixels may be projected onto a screen as the presence or absence of light. If the pixels are modulated with information in a pattern with which a viewer is familiar, the viewer may recognize the pattern when it is projected onto the screen.

Broad spectrum, or white, light emitted from a light source in a projection display engine is directed to the LCD imagers through a series of optical components such as mirrors, filters, and lenses, as shown in FIG. 1. These optical components separate the white light from the light source into its respective primary colors, usually red (R), green (G), and blue (B). These components can be quite expensive. Although projection systems with LCD imagers have been used commercially, the cost of the components is high, and precise alignment of the components is critical to their operation.

As shown in FIG. 1, white light 12 emitted from a light source 10 is collimated by lenses 14, 16, and 18, reflected by respective color filters 20 and 22, and directed towards LCD panels 30, 32, and 34. As seen from in FIG. 1, the position of LCD panels 30, 32, and 34 can be at a distance from light source 10 and as a result, additional lenses 24, 26, and 28 may be required to re-collimate the beam. The alignments of all these components relative to one another must be very accurate in order to couple light efficiently from light source 10 to LCD panels 30, 32, and 34 and minimize losses.

Furthermore, fixturing for the components to maintain their alignment can be quite costly. It would be desirable if a projection system could be built with fewer or less expensive components. It would further be desirable if a projection system could be built that was less sensitive to mis-alignment of individual components. As a result, there is a need for a system to perform polarization conversion with high efficiency, simple configurations and lower costs. Therefore, there exists a need for a projection engine configuration such that the light can be processed with simpler system requirements and reduced costs.

SUMMARY OF THE INVENTION

A primary object of the invention is to overcome the deficiencies of the related art described above by providing a light pipe-based projection engine. In particular, in a first aspect of the invention, a light pipe-based projection engine includes a low distributing reflector reflecting substantially light of a low band of wavelengths in a low initial direction and transmitting substantially light of a medium and a high bands of wavelengths in an output direction, a low initial reflector disposed reflectably to the low initial direction, the low initial reflector reflecting the light of the low band of wavelengths in a low intermediate direction substantially parallel to the output direction, a low initial light pipe disposed between the low distributing reflector and the low initial reflector, a low final reflector disposed reflectably to the low intermediate direction, the low final reflector reflecting the light of the low band of wavelengths in a low final direction substantially diametrically opposed to the low initial direction, a low modulator disposed to modulate substantially the light of the low band of wavelengths, a low final light pipe disposed between the low initial reflector and the low final reflector, a high distributing reflector reflecting substantially the light of the high band of wavelengths in a high initial direction and transmitting substantially the light of the low and the medium bands of wavelengths in substantially the output direction, a high initial reflector disposed reflectably to the high initial direction, the high initial reflector reflecting the light of the high band of wavelengths in a high intermediate direction substantially parallel to the output direction, a high initial light pipe disposed between the high distributing reflector and the high initial reflector, a high final reflector disposed reflectably to the high intermediate direction, the high final reflector reflecting the light of the high band of wavelengths in a high final direction substantially diametrically opposed to the high initial direction, a high final light pipe disposed between the high initial reflector and the high final reflector, a high modulator disposed to modulate substantially the light of the high band of wavelengths, and a medium modulator disposed in the output direction to modulate substantially the light of the medium band of wavelengths.

In a second aspect of the invention, a light pipe-based projection engine includes a low reflector reflecting substantially light of a low band of wavelengths in a low direction and transmitting substantially light of a medium and a high bands of wavelengths in an output direction, a medium reflector receiving the light of the medium and the high bands of wavelengths and reflecting substantially the light of the medium band of wavelengths in a medium direction and transmitting substantially the light of the high band of wavelengths in the output direction, an initial light pipe disposed between the low reflector and the medium reflector, a high reflector receiving the light of the high band of wavelengths and reflecting substantially the light of the high band of wavelengths in a high direction and a final light pipe disposed between the medium reflector and the high reflector.

In a third aspect of the invention, a light pipe-based projection engine includes a low reflector transmitting substantially light of a low band of wavelengths in a low direction and reflecting substantially light of a medium and a high bands of wavelengths in a first perimeter direction, a low modulator disposed in the low direction to modulate substantially the light of the low band of wavelengths, a first perimeter reflector disposed reflectably to the first perimeter direction, the first perimeter reflector reflecting substantially the light of the medium and the high bands of wavelengths in a second perimeter direction, a low light pipe disposed between the low reflector and the first perimeter reflector, a medium reflector disposed reflectably to the first perimeter direction, the medium reflector receiving the light of the medium and the high bands of wavelengths and reflecting substantially the light of the medium band of wavelengths in an output direction and transmitting substantially the light of the high band of wavelengths in a third perimeter direction, a medium initial light pipe disposed between the first perimeter reflector and the medium reflector, a medium modulator disposed in the output direction to modulate substantially the light of the medium band of wavelengths, a second perimeter reflector disposed reflectably to the third perimeter direction, the second perimeter reflector reflecting substantially the light of the high band of wavelengths in a fourth perimeter direction, a medium final light pipe disposed between the medium reflector and the second perimeter reflector, a high reflector disposed reflectably to the fourth perimeter direction, the high reflector receiving the light of the high band of wavelengths and reflecting substantially the light of the high band of wavelengths in a high direction, a high modulator disposed in the high direction to modulate substantially the light of the high band of wavelengths, a high light pipe disposed between the second perimeter reflector and the high reflector, a low combining reflector reflecting substantially the light of the low band of wavelengths in the output direction and transmitting substantially the light of the medium and the high bands of wavelengths, and a high combining reflector reflecting substantially light of the high band of wavelengths in the output direction and transmitting substantially light of the low and the medium bands of wavelengths.

In a fourth aspect of the invention, a light pipe-based projection engine includes a low reflector transmitting substantially light of a low band of wavelengths in a first perimeter direction and reflecting substantially light of a medium and a high bands of wavelengths in a second perimeter direction, a first perimeter reflector disposed reflectably to the first perimeter direction, the first perimeter reflector reflecting substantially the light of the low band of wavelengths in a low direction, a low modulator disposed in the low direction to modulate substantially the light of the low band of wavelengths, a low light pipe disposed between the low reflector and the first perimeter reflector, a medium reflector disposed reflectably to the second perimeter direction, the medium reflector receiving the light of the medium and the high bands of wavelengths and reflecting substantially the light of the medium band of wavelengths in an output direction and transmitting substantially the light of the high band of wavelengths in the second perimeter direction, a medium modulator disposed in the output direction to modulate substantially the light of the medium band of wavelengths, a medium initial light pipe disposed between the first perimeter reflector and the medium reflector, a second perimeter reflector disposed reflectably to the second perimeter direction, the second perimeter reflector reflecting substantially the light of the high band of wavelengths in a third perimeter direction, a medium final light pipe disposed between the medium reflector and the second perimeter reflector, a high reflector disposed reflectably to the third perimeter direction, the high reflector receiving the light of the high band of wavelengths and reflecting substantially the light of the high band of wavelengths in a high direction, a high modulator disposed in the high direction to modulate substantially the light of the high band of wavelengths, a high light pipe disposed between the second perimeter reflector and the high reflector, a low combining reflector reflecting substantially the light of the low band of wavelengths in the output direction and transmitting substantially the light of the medium and the high bands of wavelengths, and a high combining reflector reflecting substantially light of the high band of wavelengths in the output direction and transmitting substantially light of the low and the medium bands of wavelengths.

The present invention achieves these objects and others by providing a light pipe-based projection engine. The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, in which.

DETAILED DESCRIPTION OF THE PREFERRED EMBODIMENTS

It would be desirable for a projection system to be relatively simple to manufacture and assemble. It would be desirable for a projection system to be relatively insensitive to misalignment of individual components. It would be desirable for a projection system to be composed of relatively inexpensive components. It would be desirable for a projection system to be compact, robust, and relatively portable. It would be desirable for a projection system to rely on light guides to carry light between individual components rather than precise alignments between the components.

Although the following descriptions include liquid crystal display (LCD) panels, the same scheme applies to other image panel technologies, e.g. digital micro-mirror device (DMD), various types of transmission LCD and liquid crystal on semi-conductor (LCOS) panels.

Although three-color systems with three imager panels are used in the following examples, similar schemes would apply to systems with a single panel or two panels. Similar schemes would also apply to sequential color or color scrolling systems, as well as to color recycling or polarization recovery or recycling systems.

Figure 1:
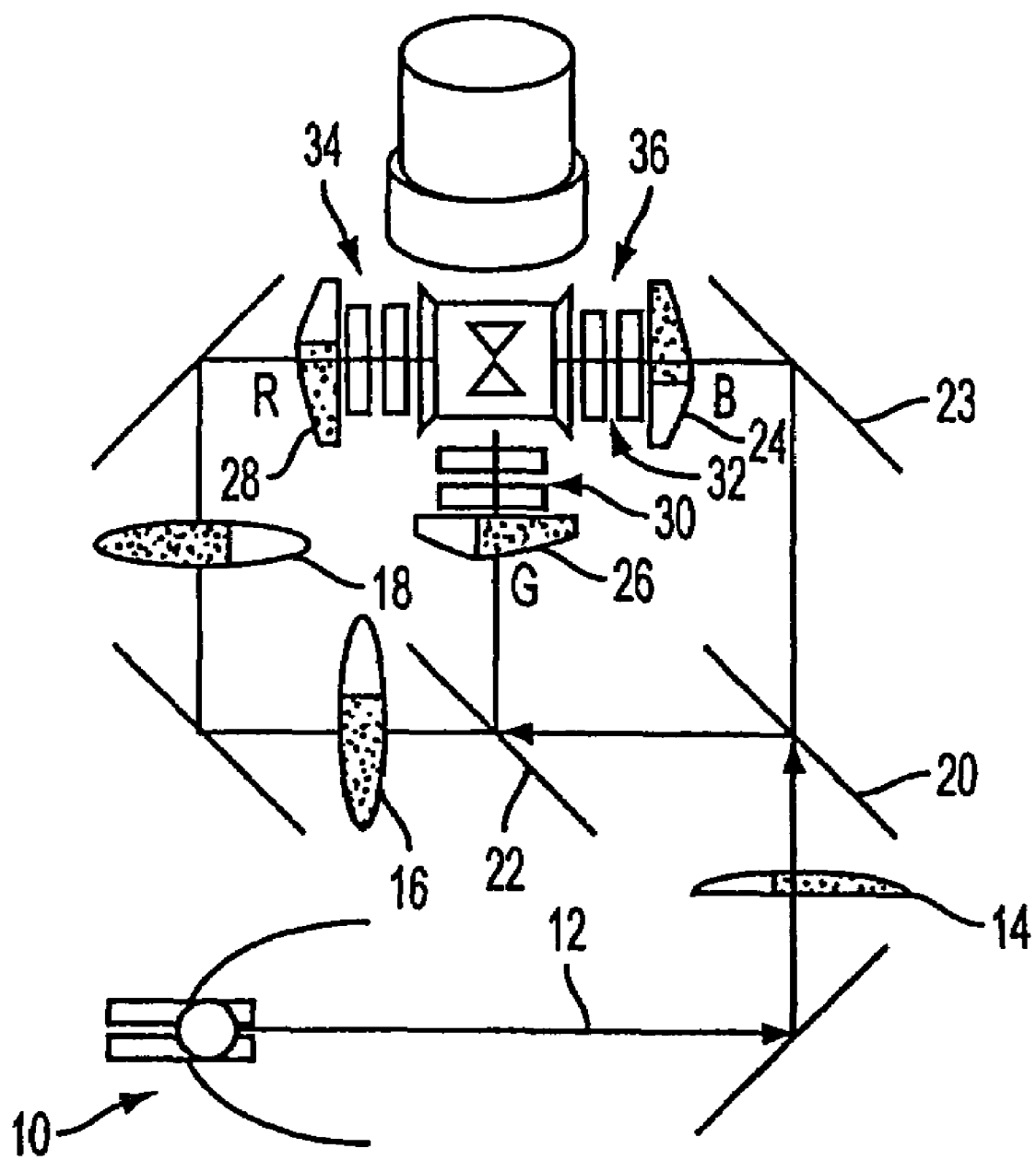
FIG. 1 shows a light pipe based projection engine according to the related art.
Figure 2A:
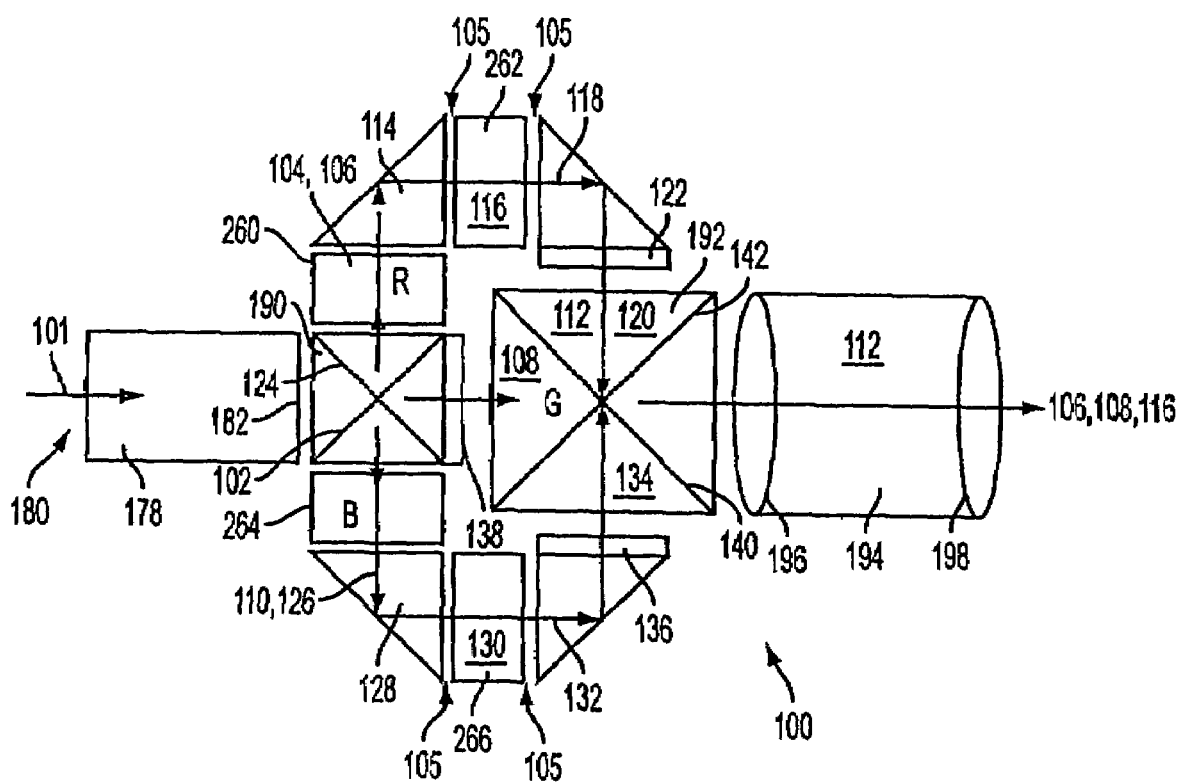
FIGS. 2A-2D show schematic diagrams of a light pipe based projection engine according to a first embodiment of the invention.

As shown in FIG. 2A, broad-spectrum, i.e. white input 101 light may directed towards low and high distributing reflectors 102, 124 through an optional input light pipe. This optional light pipe homogenizes the intensity profile of the light. Low and high distributing reflectors 102, 124 separate the light into the low, i.e. red (R), medium, i.e. green (G), and high, i.e. blue (B) components and distributes them in three different directions as shown. In this embodiment, the red light is reflected towards low initial reflector 114, reflected by low initial reflector 114, passes through a glass block, and is reflected by low final reflector 118, passes through low modulator 122, and is directed into low and high combining reflectors 140, 142. The modulated red light with the spatial information of low modulator 122 is then reflected by low and high combining reflectors 140, 142 and directed towards the projection lens. The image is subsequently projected onto the screen.

The blue light is reflected in a similar fashion toward high initial and final reflectors 128 and 132 and glass blocks, through high modulator 136, and is eventually projected onto the screen together with the red light. The green light passes through low and high distributing reflectors 102, 124 without being redirected and passes through medium modulator 138 towards low and high combining reflectors 140, 142. The modulated green light is eventually directed towards the projection lens and projected onto the screen. The final result is that the three colors are separated, modulated, and combined to form a single color image on the screen.

Light emitted by a light source may be directed to imagers through a series of light pipes and prisms. Since these light pipes and prisms can be assembled together with high precision without too much fixturing, the cost for the final projection engine will be very competitive. Although the light is shown being separated spatially for purposes of illustration, the modulators could be lined up in series if they were able to differentiate between input wavelengths of light. In this case, low and high distributing reflectors 102, 124 and low and high combining reflectors 140, 142 could be dispensed with, along with the intermediate prisms and reflectors.

In particular, in a first embodiment shown in FIG. 2A, a light pipe-based projection engine 100 may include a low distributing reflector 102 reflecting substantially light of a low band of wavelengths 104 in a low initial direction 106 and transmitting substantially light of a medium and a high bands of wavelengths 108, 110 in an output direction 112. A low initial reflector 114 may be disposed reflectably to low initial direction 106 to direct light of low band of wavelengths 104 in a low intermediate direction 116 substantially parallel to output direction 112. In several embodiments, low initial reflector 114 may be a prism, an acute angle, right angle, or obtuse angle prism, a mismatched impedance, or a mirror.

Figure 15A:
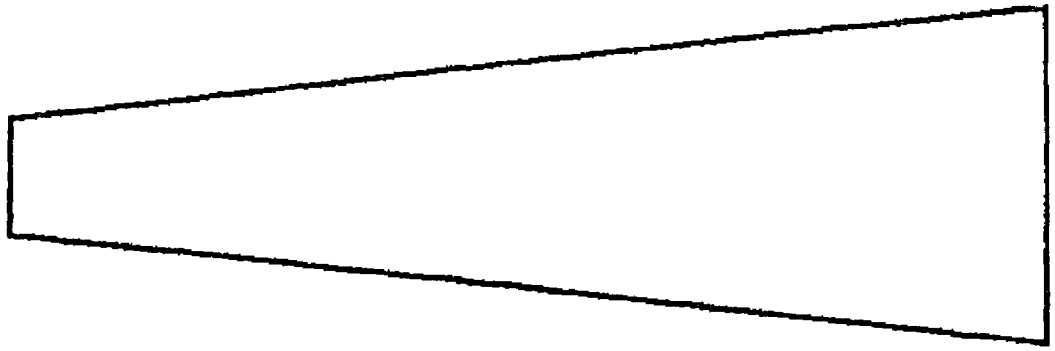
FIGS. 15A-15C show light pipes for use with an embodiment of the invention.
Figure 15B:
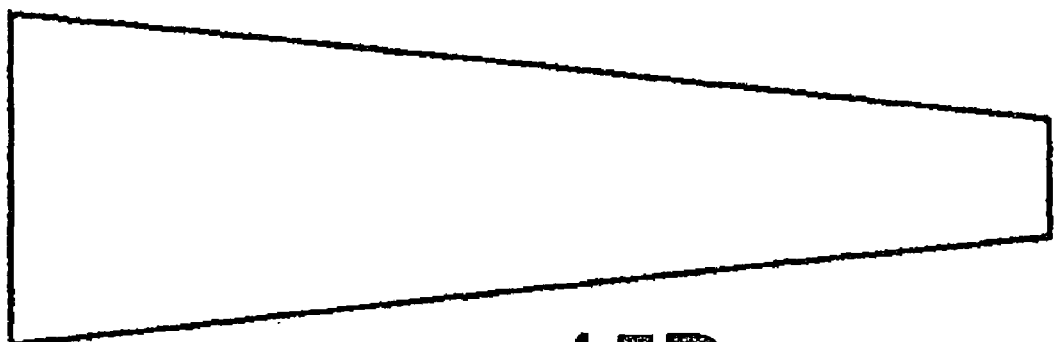
Figure 15C:
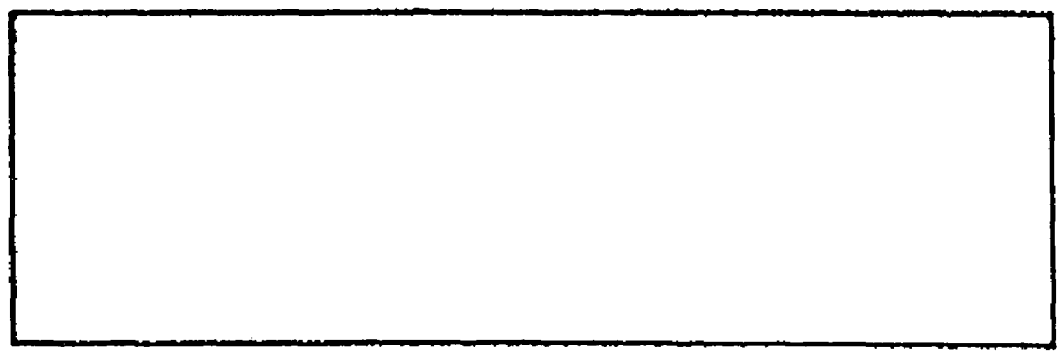

In one embodiment, light pipe-based projection engine 100 may include a low initial light pipe 260 to receive light of low band of wavelengths 104 from low distributing reflector 102 and transmit substantially light of low band of wavelengths 104 to low initial reflector 114. In several embodiments, low initial light pipe 260 may be made of a material such as quartz, glass, plastic, or acrylic. In several embodiments, low initial light pipe 260 may be a straight light pipe (SLP), or a tapered light pipe (TLP), as shown in FIGS. 15A-15C.

A low final reflector 118 may be disposed reflectably to low intermediate direction 116 to direct light of low band of wavelengths 104 in a low final direction 120 substantially diametrically opposed to low initial direction 106. In several embodiments, low final reflector 118 may be a prism, an acute angle, right angle, or obtuse angle prism, a mismatched impedance, or a mirror. A low modulator 122 may be disposed to modulate substantially light of low band of wavelengths 104.

In one embodiment, light pipe-based projection engine 100 may include a low final light pipe 262 to receive light of low band of wavelengths 104 from low initial reflector 114 and transmit substantially light of low band of wavelengths 104 to low final reflector 118. In several embodiments, low final light pipe 262 may be made of a material such as quartz, glass, plastic, or acrylic. In several embodiments, low final light pipe 262 may be a straight light pipe or a tapered light pipe, as shown in FIGS. 15A-15C.

In one embodiment, light pipe-based projection engine 100 may also include a high distributing reflector 124 reflecting substantially light of high band of wavelengths 110 in a high initial direction 126 and transmitting substantially light of low and medium bands of wavelengths 106, 108 in substantially output direction 112. In one embodiment, low and high distributing reflectors 102, 124 comprise a distributing X-prism 190. A high initial reflector 128 may be disposed reflectably to high initial direction 126 to reflect light of high band of wavelengths 110 in a high intermediate direction 130 substantially parallel to output direction 112. In several embodiments, high initial reflector 128 may be a prism, an acute angle, right angle, or obtuse angle prism, a mismatched impedance, or a mirror.

In one embodiment, light pipe-based projection engine 100 may include a high initial light pipe 264 to receive light of high band of wavelengths 110 from high distributing reflector 124 and transmit substantially light of high band of wavelengths 110 to high initial reflector 128. In several embodiments, high initial light pipe 264 may be made of a material such as quartz, glass, plastic, or acrylic. In several embodiments, high initial light pipe 264 may be a straight light pipe or a tapered light pipe, as shown in FIGS. 15A-15C.

A high final reflector 132 may be disposed reflectably to high intermediate direction 130 to direct light of high band of wavelengths 110 in a high final direction 134 substantially diametrically opposed to high initial direction 126. In several embodiments, high final reflector 132 may be a prism, an acute angle, right angle, or obtuse angle prism, a mismatched impedance, or a mirror. A high modulator 136 may be disposed to modulate substantially light of high band of wavelengths 110. A medium modulator 138 may be disposed in output direction 112 to modulate substantially light of medium band of wavelengths 108.

In one embodiment, light pipe-based projection engine 100 may include a high final light pipe 266 to receive light of high band of wavelengths 110 from high initial reflector 128 and transmit substantially light of high band of wavelengths 110 to high final reflector 132. In several embodiments, high final light pipe 266 may be made of a material such as quartz, glass, plastic, or acrylic. In several embodiments, high final light pipe 266 may be a straight light pipe or a tapered light pipe, as shown in FIGS. 15A-15C.

In one embodiment, light pipe-based projection engine 100 may include a low combining reflector 140 disposed in low final direction 120 to direct substantially light of low band of wavelengths 104 in output direction 112 and transmit substantially light of medium and high bands of wavelengths 108, 110. In this embodiment, light pipe-based projection engine 100 may also include a high combining reflector 142 disposed in high final direction 134 to direct substantially light of high band of wavelengths 110 in output direction 112 and transmit substantially light of low and medium bands of wavelengths 106, 108. In one embodiment, low and high combining reflectors 140, 142 comprise a combining X-prism 192.

Figure 8:
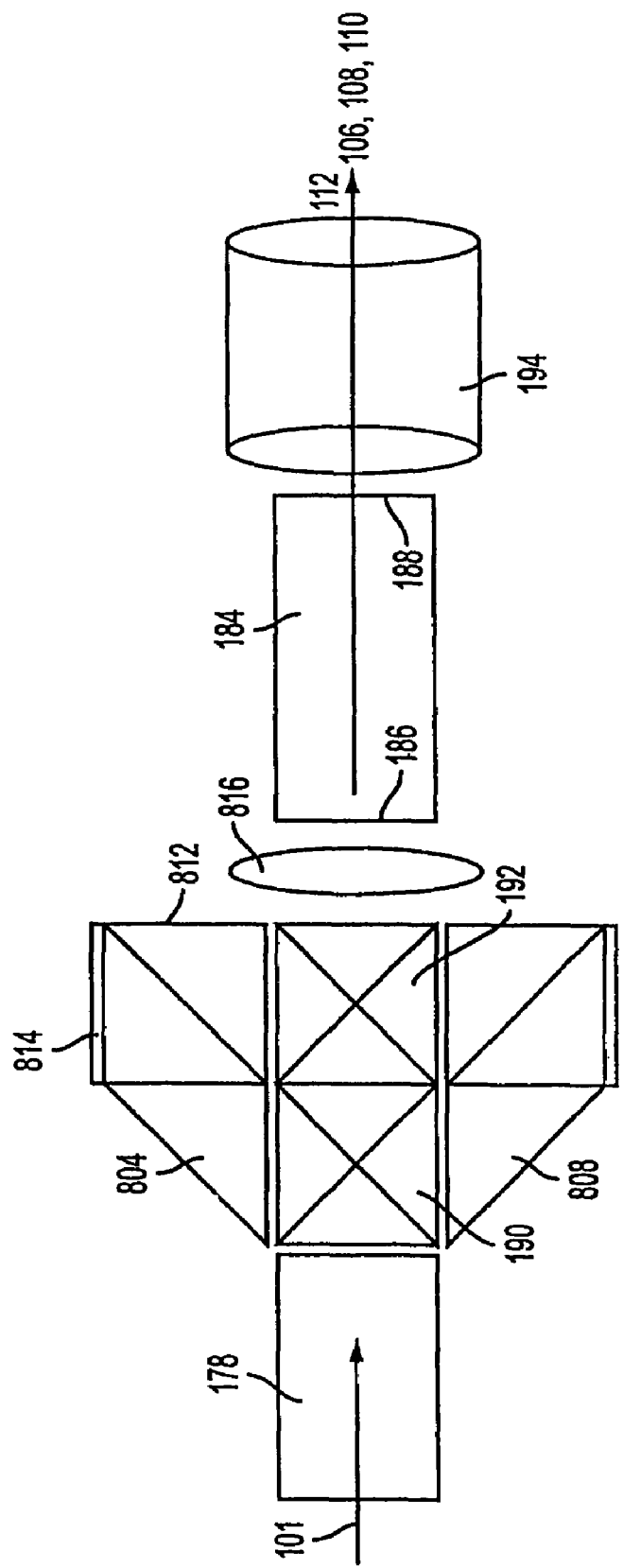
FIG. 8 shows a projection lens arrangement for use with an embodiment of the invention.

In one embodiment, light pipe-based projection engine 100 may also include a projection lens system 984, such as a projection lens system 994 comprised of two lenses, 986 and 988 as shown in FIG. 8, disposed in output direction 112 to collect and focus light of low, medium, and high bands of wavelengths 106, 108, 110.

In one embodiment, light pipe-based projection engine 100 may include an input light pipe 178 having an input surface 180 and an output surface 182. Output surface 182 may be disposed substantially proximate to low and high distributing reflectors 102, 124. Input light pipe 178 may receive light at input surface 180 and transmit substantially light at output surface 182 to low and high distributing reflectors 102, 124.

In several embodiments, a shape of input surface 180 may be a flat, convex, concave, toroidal, and spherical. In several embodiments, a shape of output surface 182 may be a flat, convex, concave, toroidal, and spherical. In several embodiments, input light pipe 178 may be made of a material such as quartz, glass, plastic, or acrylic. In several embodiments, input light pipe 178 may be a straight light pipe or a tapered light pipe, as shown in FIGS. 20A-20C.

Images from each of the three imagers may be combined by combining X-prism 192 such that a single color image is projected onto the screen by the projection lens, as shown in FIG. 2A. The combining X-prism 192 should be large enough to transmit substantially all of the light from the imager so that it will be collected by the projection lens. In particular, the combining X-prism 192 should be large enough to accommodate the numerical aperture (NA) of the illumination system, or at least the NA of the component immediately upstream from the combining X-prism 192, i.e. the component from which it receives light. If combining X-prism 192 is not large enough to accommodate the NA of the component from which it receives light, the light may hit the sidewall of combining X-prism 192 and be lost or reflected to the output as unwanted ghost images. As a result, the larger the NA, the larger will be combining X-prism 192 and the further away will be the projection lens from the imager chips. This increase in distance between the projection lens from the imager chips may also increase the cost of the projection lens significantly, since alignment of the projection lens and the imager chips will be less tolerant of angular deviation.

In several embodiments, gaps 105 may be inserted between the individual components of the projection engine to allow more efficient transmission of light. In particular, gaps 105 may be inserted between individual light pipes, prism, or beams splitters. In several embodiments these gaps 105 may be filled with air, or gaps 105 may be filled with a material having a low index of refraction, such as a clear or relatively transparent epoxy. In particular, each of gaps 105 separates the surfaces of two optical components, which may be made of an optical glass, in order to separate the indices of refraction at the surfaces of the optical components from one another by imposing a third index of refraction between them.

In the absence of gaps 105 between optical components, light may be able to follow approximately the same path through two adjacent optical components. This may be less than desirable if the path through the two optical components is at an angle that will allow the light to pass through the walls of the optical components and be lost into free space. If, on the other hand, gap 105 is inserted between two optical components, such as a gap filled with a material of a lower index of refraction than that of either optical component individually, some of the light that would otherwise escape from the optical component may be reflected at gaps 105 and remain within the optical component.

This may be desirable if the light that is at risk of escaping in the absence of gaps 105 is traveling at an angle that would allow it to leave the projection engine entirely. Gap 105 may thus retain light within the projection engine through total internal reflection (TIR). Gap 105 may cause the light to refract at a different angle than the path it has taken through one optical component as it travels to the other optical component.

In the case of reflective imager chips such as LCOS or digital light projection (DLP), the need for the reflection together with the need for combining light from three imager chips normally requires a PBS and combining X-prism 192 and as a result, the imager chip will be "two prisms" away from the output face of the combining X-prism 192 as shown in FIG. 8. This added distance between the imager chips and the combining X-prism 192 may contribute to high costs of the projection lens in LCOS or DLP systems. An angular misalignment between any two serial components may degrade the efficiency of such a projection engine significantly. The added costs may result from the need for more accurate alignment between the imager chips and the combining X-prism 192, as well as between the intermediate components. In one embodiment, the cross-sections of the PBS and X-prism may be substantially the same as the active area of the imaging panel. In this embodiment, large angle light may be reflected by the sidewall of the PBS and X-prism by total internal reflections.

Figure 9:
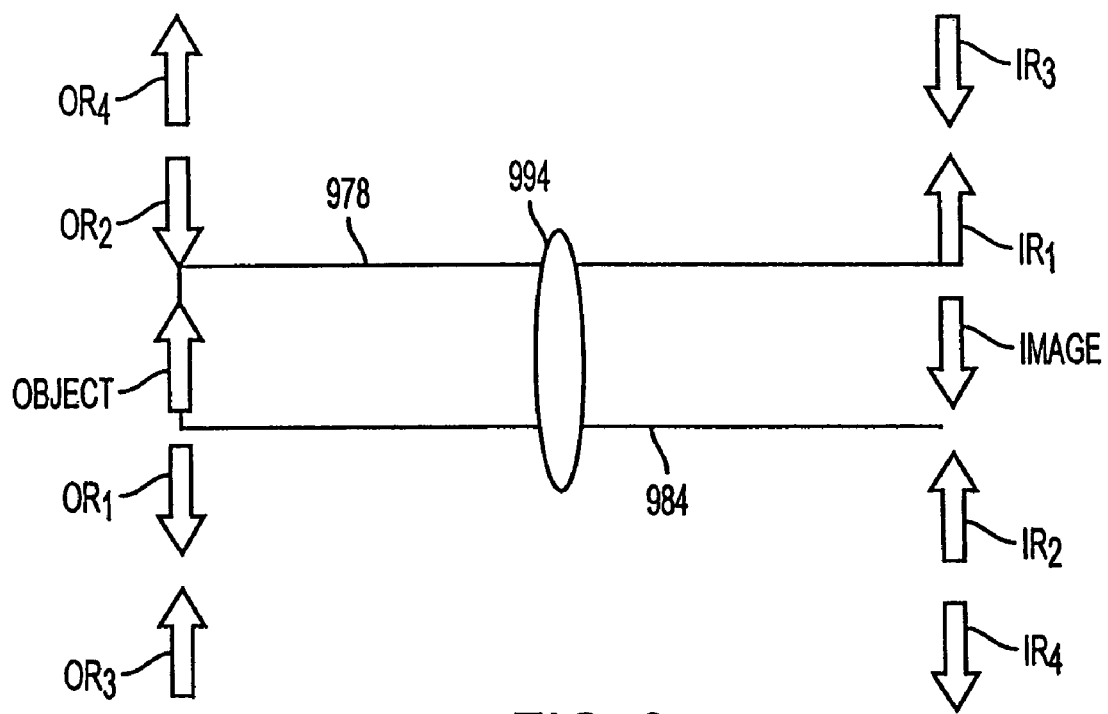
FIG. 9 shows a projection lens for use with an embodiment of the invention.

In one embodiment, shown in FIG. 9, the above-described problems are substantially eliminated. The image of the imager chip is shown as the object in the diagram, which is shown as an arrow. Distributing prism 190 and combining X-prism 192 described previously are represented by a single input light pipe 978 with aspect ratio of 2:1 from this perspective. The other dimension of the light pipe may depend on the dimension of the imaging panel. There will appear to be an array of images, referenced OR1, OR2, . . . etc. in FIG. 9, due to multiple reflections from the sidewalls when looking into input light pipe 978. A one-dimensional array of images is shown in FIG. 9, although for a rectangular light pipe this will be a 2-dimensional array. The number of images will be dependent on the numerical aperture (NA) of the system.

If a projection lens 994 is placed at the exit of input light pipe 978 the array of images will be projected onto the screen. This may not be desirable. To overcome this problem, an output light pipe 984 with the same dimension as input light pipe 978 may be placed at the output of the projection system.

A lens or lens system 994 is placed in between the light pipes such that the array of images of the object is imaged at the output plane of output light pipe 984 with unit magnification as shown. Multiple images IR1, IR2, . . . etc. will then be combined by output light pipe 984 and form a single output image. In this manner, all the light emitted from the object will be collected at the image with substantially no loss, resulting in a single image. A projection lens 194, as shown in FIG. 8, is then used to project this image onto the screen. In this embodiment, the image at the output of light pipe 984 will be very close the to projection lens and as a result, the cost of the projection lens may be reduced.

In another embodiment, the F-number of the lens as shown in FIG. 9 can be made large so as to reduce the cost of the lens and reduce distortion by increasing the length of the input and output light pipes. Since input light pipe 978 is a representation of the PBS and combining X-prism 192 used in the projection engine as shown in FIG. 8, the increase in length is achieved by adding a prism or light pipe in between the combining X-prism 192 and the lens. There will be a trade-off between the increase in cost of the extra prism or light pipe added versus the reduction in cost of the lens and the improved image quality.

In another embodiment, output light pipe 984 can be of different dimensions such that the lens used can magnify or de-magnify the images as desired based on the dimensions of output light pipe 984.

In another embodiment, the input and output light pipes 978 and 984 shown in FIG. 9 can have curved surfaces facing each other instead of flat surfaces. In this embodiment, curved surfaces replace lens 994 or are in addition to lens 994 such that the image at the LCOS chips is mapped to the output face of output light pipe 984.

FIG. 8 shows one embodiment of an LCOS projection system. White input light 101, which can be polarized or unpolarized, is directed into the distributing X-prism 190 through an optional input light pipe 178. The distributing X-prism 190 can be a 2-color, 3-color, 4-color, 5-color, or more color light splitting prism. It is shown as a 2-color splitting prism for convenience. The 2 colors are directed in opposite directions and redirected forward using the prisms 808 and 804 as shown. Following the reflected light from prism 808, the light is reflected by PBS 812 into LCOS 814.

The image information at LCOS 814 modulates the light and reflects the image towards combining X-prism 192 and eventually redirected towards the lens 816 as shown. The other color light beams will propagate to lens 816 in a similar fashion while modulated by a different color LCOS chip. Combining X-prism 192 combines all these images and form a single output color image. The lens 816 images the LCOS images through combining X-prism 192 and the respective PBS's onto the output face of output light pipe 184. The combined images at the output face are then projected by the projection lens onto the screen. Again, the output lens is close to the image at output light pipe 184, thus reduces the cost of the lens 816.

Figure 14:
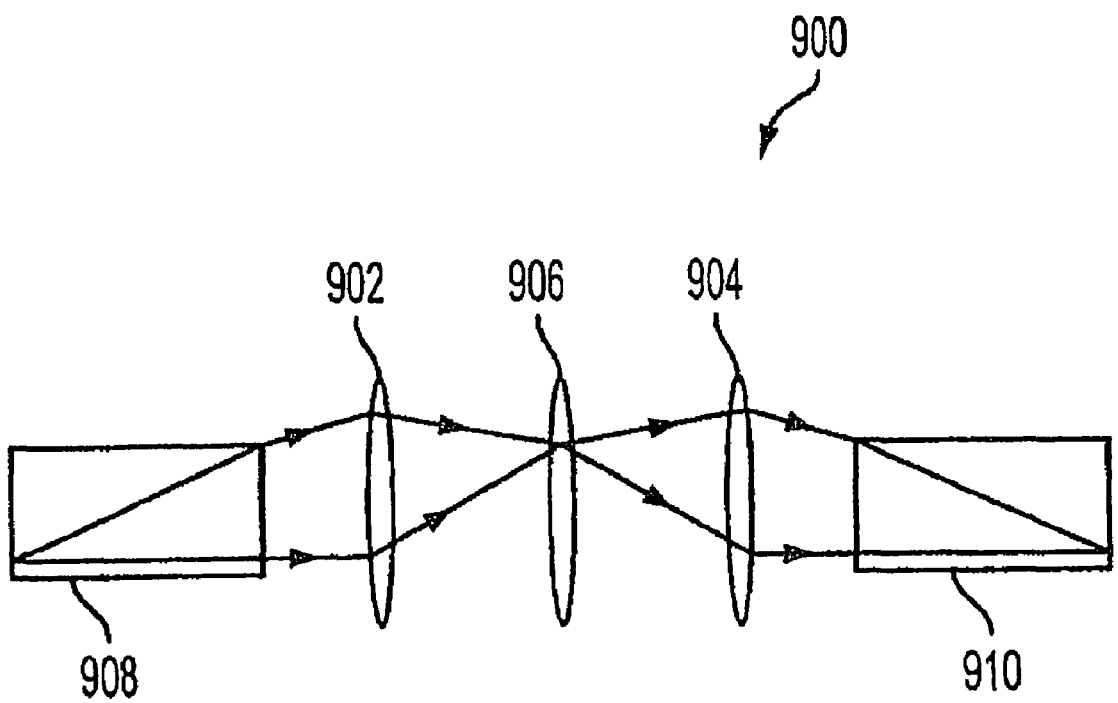
FIG. 14 shows a lens system for use with an embodiment of the invention.

Lens 816 shown in FIG. 8 and lens 994 shown in FIG. 9 can be a lens system 900 consisting of multiple elements. In one embodiment, lens system 900 consists of a first and second imaging lenses 902, 904 and a field lens 906 disposed in between as shown in FIG. 14. First imaging lens 902 focuses an input light pipe 908 image onto field lens 906. Field lens 906 changes the direction of the light and the image is then refocused by second imaging lens 904 onto the output of an output light pipe 910. Substantially all the light emerging from input light pipe 908 will be focused into output light pipe 910, theoretically without loss, due to the symmetry of the system.

In one embodiment, light pipe-based projection engine 100 may include a projection lens 194 disposed proximate to output direction 112 to collect and focus substantially light of low, medium, and high bands of wavelengths 106, 108, 110. An output light pipe 184 may have an input surface 186 disposed proximate to output direction 112 and an output surface 188. Output light pipe 184 may receive light at input surface 186 and transmitting substantially light at output surface 188.

In several embodiments, a shape of input surface 186 may be flat, convex, concave, toroidal, and spherical. In several embodiments, a shape of output surface 188 may be flat, convex, concave, toroidal, and spherical. In several embodiments, output light pipe 184 may be made of a material such as quartz, glass, plastic, or acrylic. In several embodiments, output light pipe 184 may be a SLP, or a TLP.

Figure 4:
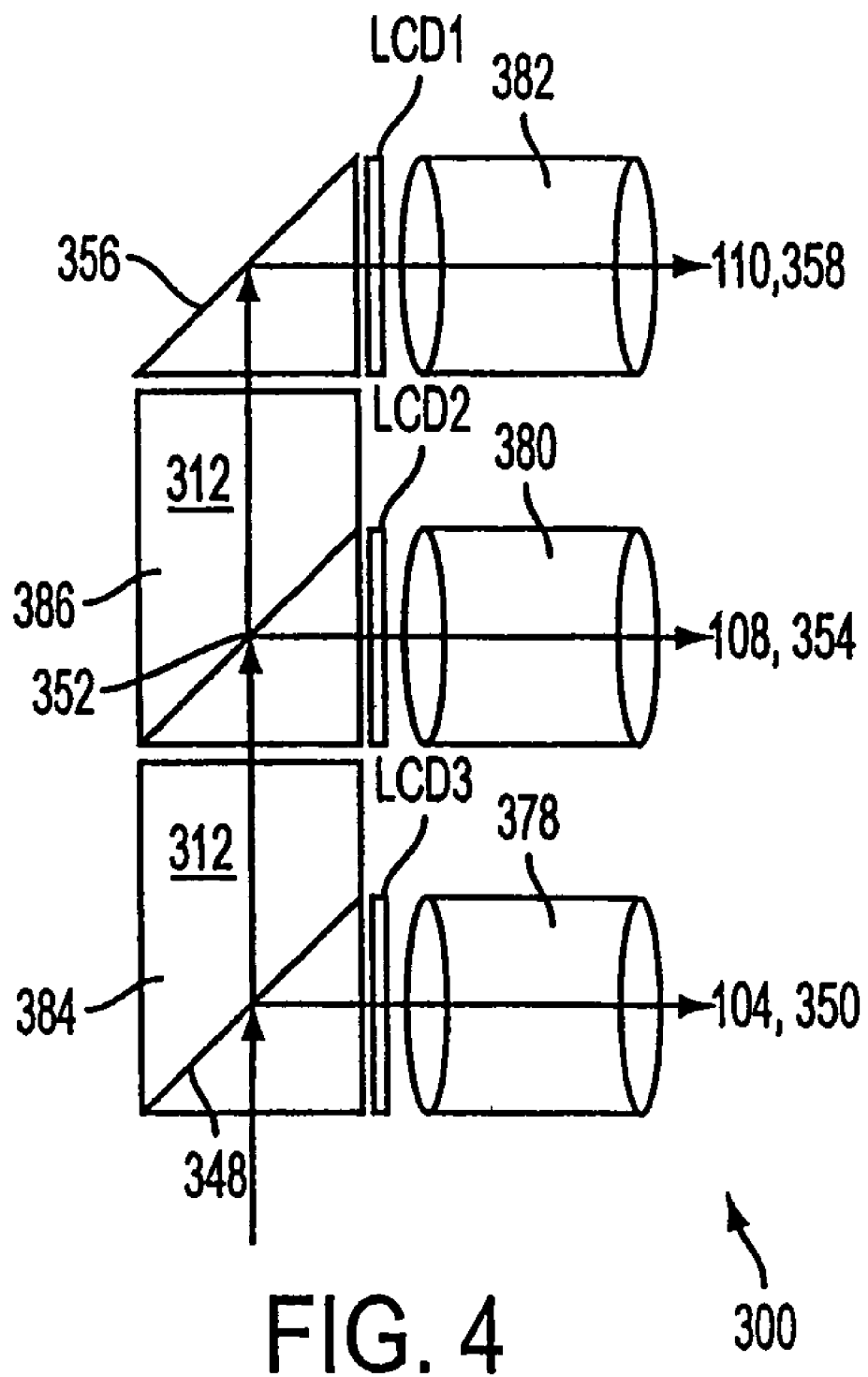
FIG. 4 shows a schematic diagram of a light pipe based projection engine according to a second embodiment of the invention.
Figure 5:
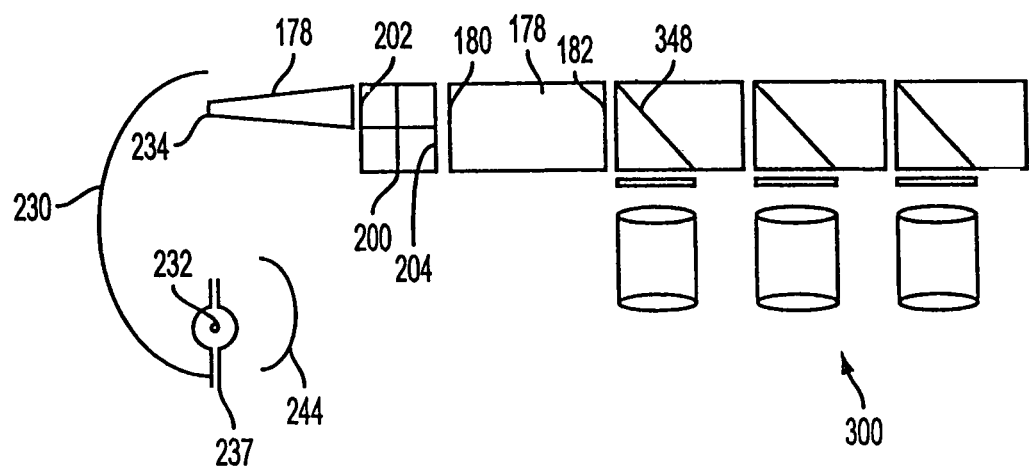
FIG. 5 shows a further development of the light pipe based projection engine shown in FIG. 4.

Although the above system described address an RGB color system, other color systems with more than three primary colors, e.g. 4, or 5 color systems can also be implemented. The extension of the projection system as shown in FIG. 4 to 4 or 5 colors can be achieved by extending the prism, light guide, LCD, and projection lens to the 4th and/or the 5th color with addition of the extra components similar to the second and third colors.

Figure 6:
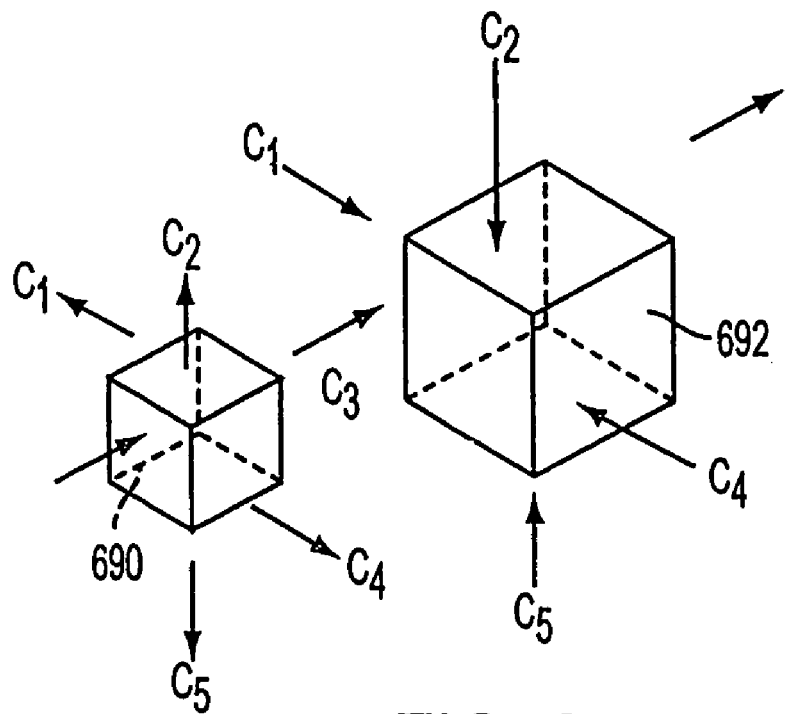
FIG. 6 shows four- and five-color X-prisms for use with an embodiment of the invention.
Figure 7:
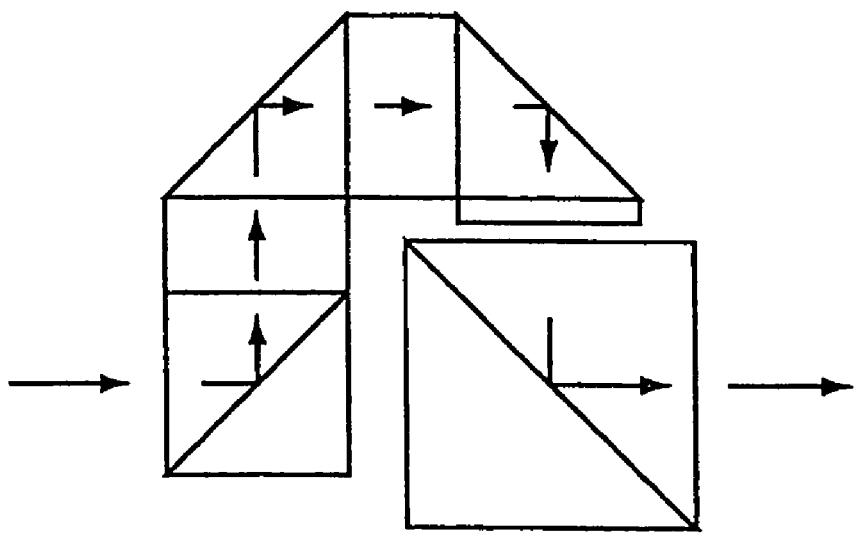
FIG. 7 shows prisms and glass blocks for use with an embodiment of the invention.

As shown in FIG. 6, the three color system shown in FIG. 2A can be extended to 4 or 5 colors using a 5-color X-prism 690. 5-color X-prism 690 can also be used as a 4-color system by eliminating one of the five colors. 5-color X-prism 690 has four diagonal reflective surfaces, each of which reflects one of 5 colors of light, $c_1$, $c_2$, $c_3$, $c_4$, and $c_5$. In several embodiments, colors of light, $c_1$, $c_2$, $c_3$, $c_4$, and $c_5$ may be primary colors. One of the five colors will not be reflected by any of the four reflective surfaces, but rather will be transmitted through. Each of the four reflected color beams are then directed towards a 5-color combining X-prism 692 through a series of right angle prisms and glass blocks as shown in FIG. 7. The color-combining prism may have diagonal reflective surfaces similar to X-prism 690. In one embodiment, the diagonal reflective surfaces of 5-color combining X-prism 692 are complimentary to those of 5-color X-prism 690. The combined output will then be projected onto the screen through a projection lens.

Figure 2B:
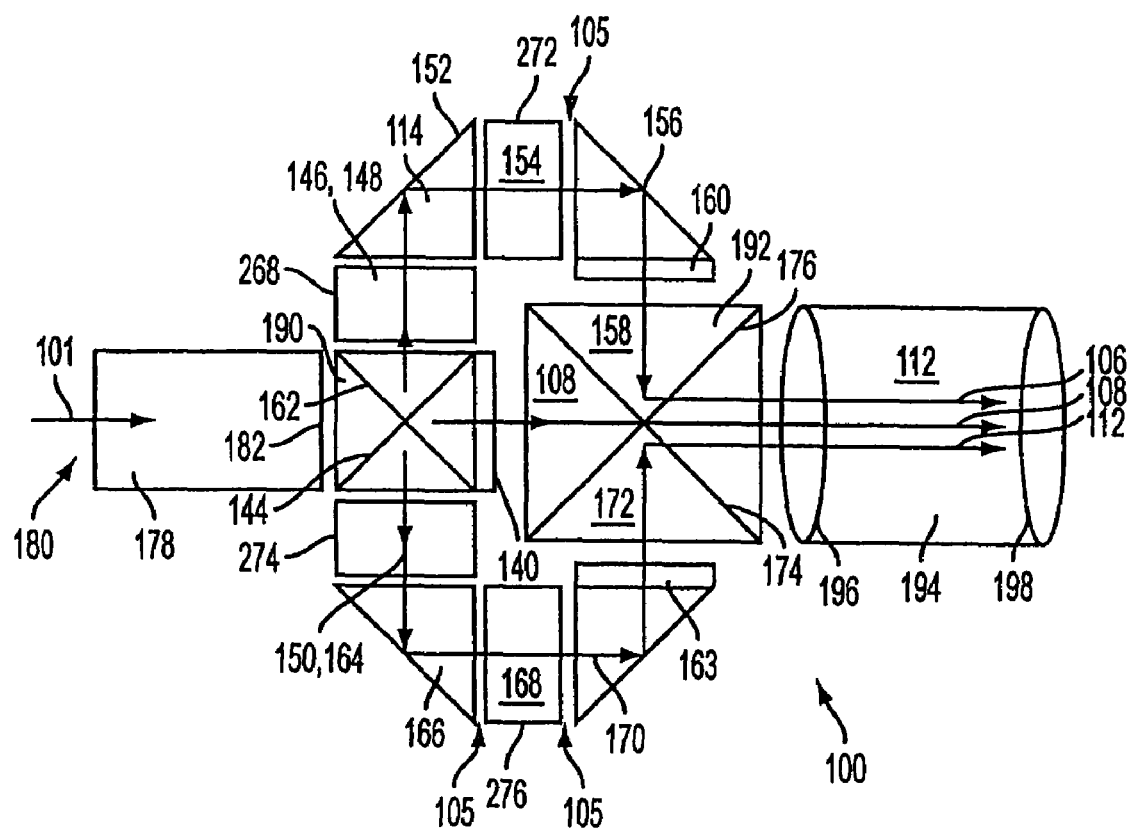

FIG. 2B shows two further light paths that could be added to those shown in FIG. 2A. The components shown in FIG. 2B are displayed from an angle rotated approximately ninety degrees about output direction 112 from the view of FIG. 2A, for purposes of illustration. In particular, as shown in FIG. 2B, light pipe-based projection engine 100 may also include a low-medium distributing reflector 144 reflecting substantially light of a low-medium band of wavelengths 146 in a low-medium initial direction 148 and transmitting substantially light of a high-medium band of wavelengths 150 and light of low, medium, and high bands of wavelengths 106, 108, 110 in an output direction 112. A low-medium initial reflector 152 may be disposed reflectably to low-medium initial direction 148 to reflect light of low-medium band of wavelengths 146 in a low-medium intermediate direction 154 substantially parallel to output direction 112.

In one embodiment, light pipe-based projection engine 100 may include a low-medium initial light pipe 268 to receive light of low-medium band of wavelengths 146 from low-medium distributing reflector 144 and transmit substantially light of low-medium band of wavelengths 146 to low-medium initial reflector 152. In several embodiments, low-medium initial light pipe 268 may be made of a material such as quartz, glass, plastic, or acrylic. In several embodiments, low-medium initial light pipe 268 may be a straight light pipe or a tapered light pipe, as shown in FIGS. 15A-15C.

A low-medium final reflector 156 may be disposed reflectably to low-medium intermediate direction 154 to reflect light of low-medium band of wavelengths 146 in a low-medium final direction 158 substantially diametrically opposed to low-medium initial direction 148. A low-medium modulator 160 may be disposed to modulate substantially light of low-medium band of wavelengths 146.

In one embodiment, light pipe-based projection engine 100 may include a low-medium final light pipe 272 to receive light of low-medium band of wavelengths 146 from low-medium initial reflector 152 and transmit substantially light of low-medium band of wavelengths 146 to low-medium final reflector 156. In several embodiments, low-medium final light pipe 272 may be made of a material such as quartz, glass, plastic, or acrylic. In several embodiments, low-medium final light pipe 272 may be a straight light pipe or a tapered light pipe, as shown in FIGS. 15A-15C.

In this embodiment, a high-medium distributing reflector 162 may reflect substantially light of high-medium band of wavelengths 150 in a high-medium initial direction 164 and transmit substantially light of low-medium band of wavelengths 146 and light of low, medium, and high bands of wavelengths 106, 108, 110 in substantially output direction 112. A high-medium initial reflector 166 may be disposed reflectably to high-medium initial direction 164 to reflect light of high-medium band of wavelengths 150 in a high-medium intermediate direction 168 substantially parallel to output direction 112.

In one embodiment, light pipe-based projection engine 100 may include a high-medium initial light pipe 274 to receive light of high-medium band of wavelengths 150 from high-medium distributing reflector 162 and transmit substantially light of high-medium band of wavelengths 150 to high-medium initial reflector 166. In several embodiments, high-medium initial light pipe 274 may be made of a material such as quartz, glass, plastic, or acrylic. In several embodiments, high-medium initial light pipe 274 may be a straight light pipe or a tapered light pipe, as shown in FIGS. 15A-15C.

A high-medium final reflector 170 may be disposed reflectably to high-medium intermediate direction 168 to reflect light of high-medium band of wavelengths 150 in a high-medium final direction 172 substantially diametrically opposed to high-medium initial direction 164. A high-medium modulator 163 may be disposed to modulate substantially light of high-medium band of wavelengths 150.

In one embodiment, light pipe-based projection engine 100 may include a high-medium final light pipe 276 to receive light of high-medium band of wavelengths 150 from high-medium initial reflector 166 and transmit substantially light of high-medium band of wavelengths 150 to high-medium final reflector 170. In several embodiments, high-medium final light pipe 276 may be made of a material such as quartz, glass, plastic, or acrylic. In several embodiments, high-medium final light pipe 276 may be a straight light pipe or a tapered light pipe, as shown in FIGS. 15A-15C.

In one embodiment, light pipe-based projection engine 100 may include a low-medium combining reflector 174 reflecting substantially light of low-medium band of wavelengths 146 in output direction 112 and transmitting substantially light of low, medium, high, and high-medium bands of wavelengths 106, 108, 110, 150 in output direction 112. Light pipe-based projection engine 100 may also include a high-medium combining reflector 176 reflecting substantially light of high-medium band of wavelengths 150 in output direction 112 and transmitting substantially light of low, medium, high, and low-medium bands of wavelengths 106, 108, 110, 146 in output direction 112.

Figure 2C:
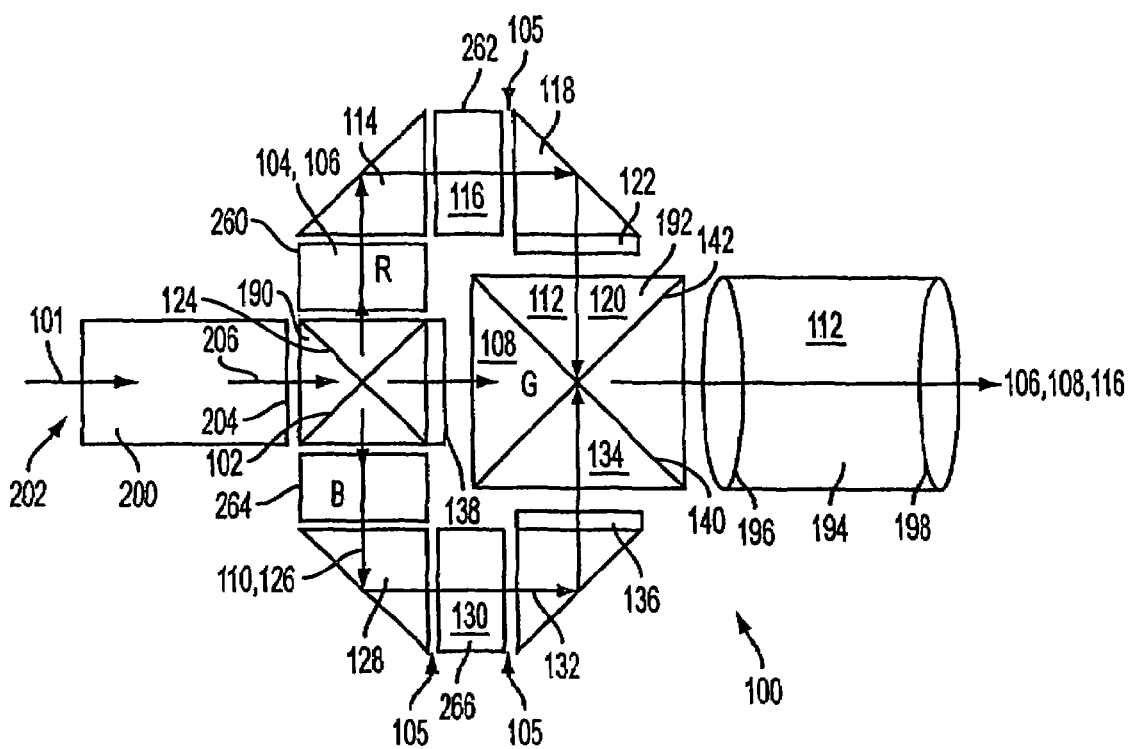

In one embodiment, shown in FIG. 2C, light pipe-based projection engine 100 may also include a polarization recovery apparatus 200. Polarization recovery apparatus 200 may be disposed substantially proximate to low and high distributing reflectors 102, 124 to receive substantially un-polarized light at an input surface 202 and transmit substantially light of useful polarization 206 at an output surface 204 to low and high distributing reflectors 102, 124.

Figure 16:
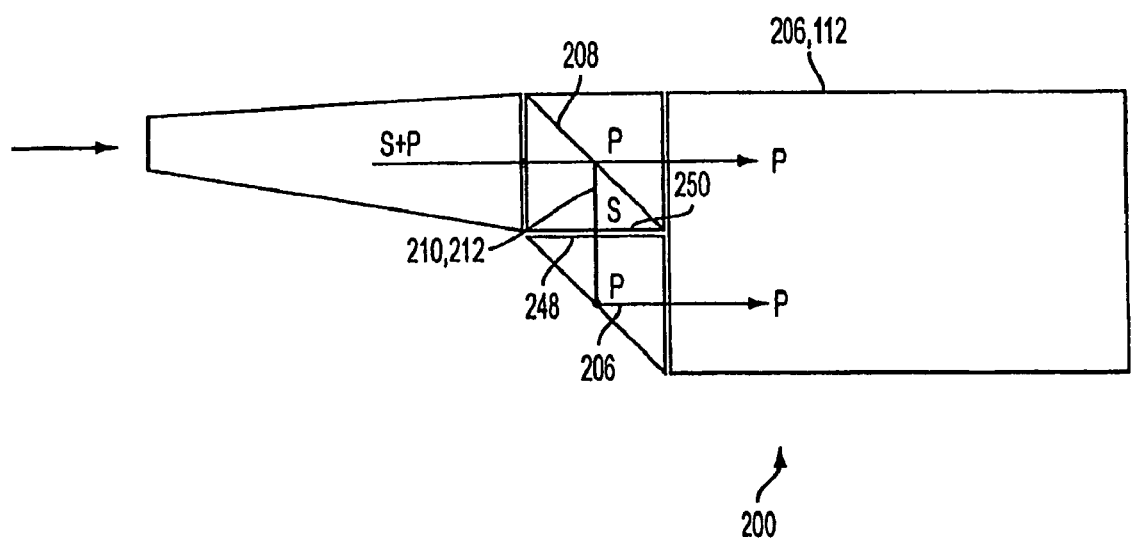
FIG. 16 shows a polarization recovery system for use with an embodiment of the invention.

In one embodiment, shown in FIG. 16, polarization recovery apparatus 200 may include a polarizing beam splitter 208. Polarizing beam splitter 208 may transmit light of useful polarization 206 in output direction 112 and reflect a non-useful polarization light 210 in a first orthogonal direction 212 substantially orthogonal to output direction 112. In several embodiments, polarizing beam splitter 208 may be a prism or a mirror with a polarizing coating or pattern, such as a Bragg grating, on one surface.

In one embodiment, a wave plate 248, such as a half-wave plate, may be disposed in first orthogonal direction 212 to delay or rotate non-useful polarization light 210 until it becomes light of useful polarization 206. In another embodiment, there may be a gap 250 between polarizing beam splitter 208 and wave plate 248. In this embodiment light may be retained within a prism comprising polarizing beam splitter 208 by total internal reflection (TIR). In several embodiments, gap 250 may be filled with air or a compound characterized by a low index of refraction.

Figure 17A:
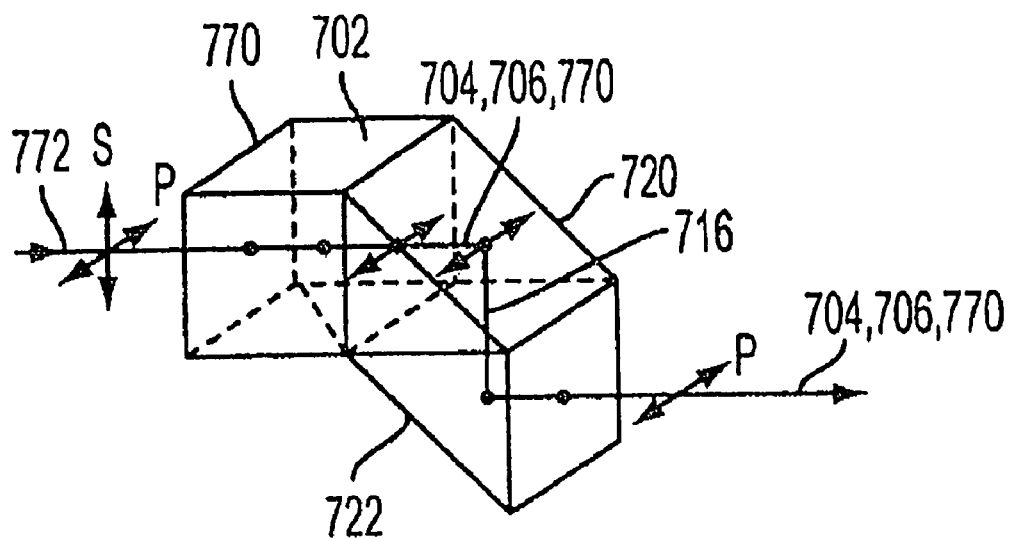
FIGS. 17A-17B show a polarization recovery system for use with an embodiment of the invention.
Figure 17B:
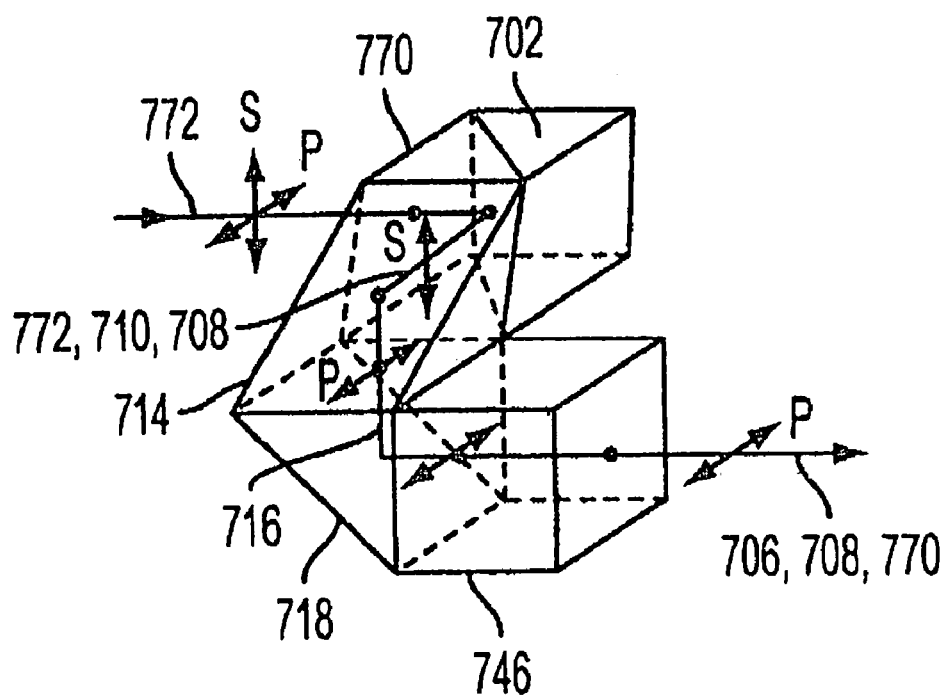
Figure 18A:
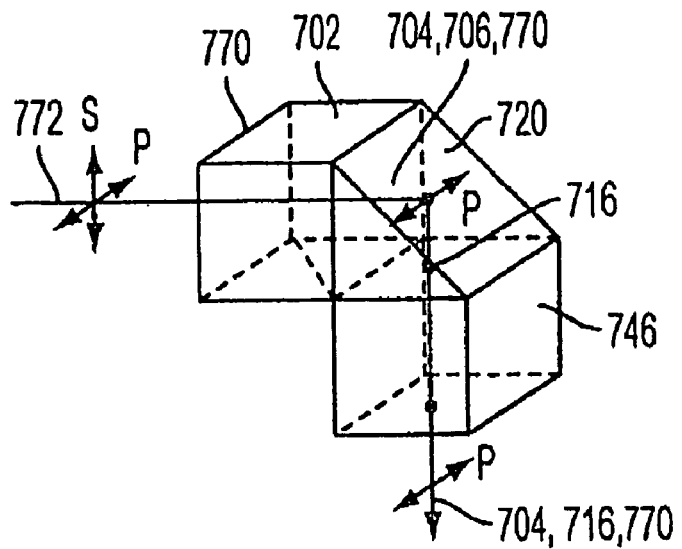
FIGS. 18A-18B show a polarization recovery system for use with an embodiment of the invention.
Figure 18B:
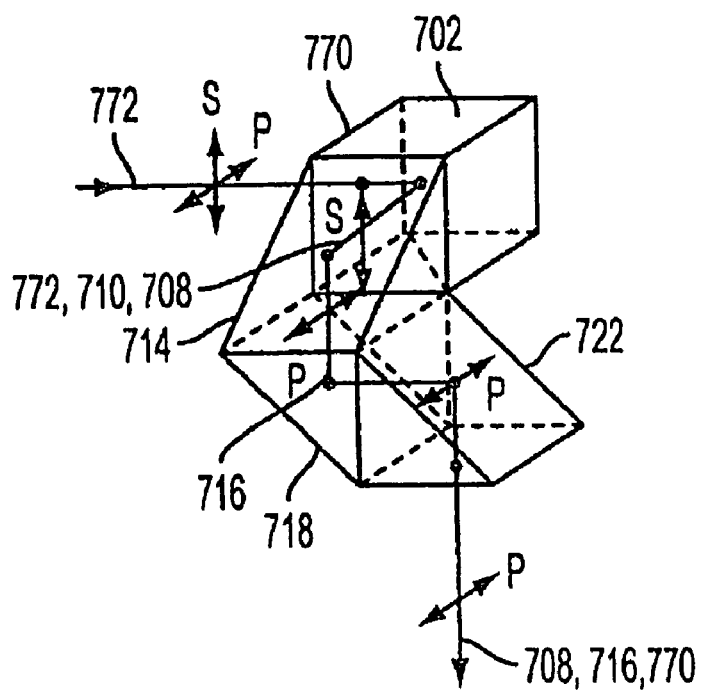
Figure 19A:
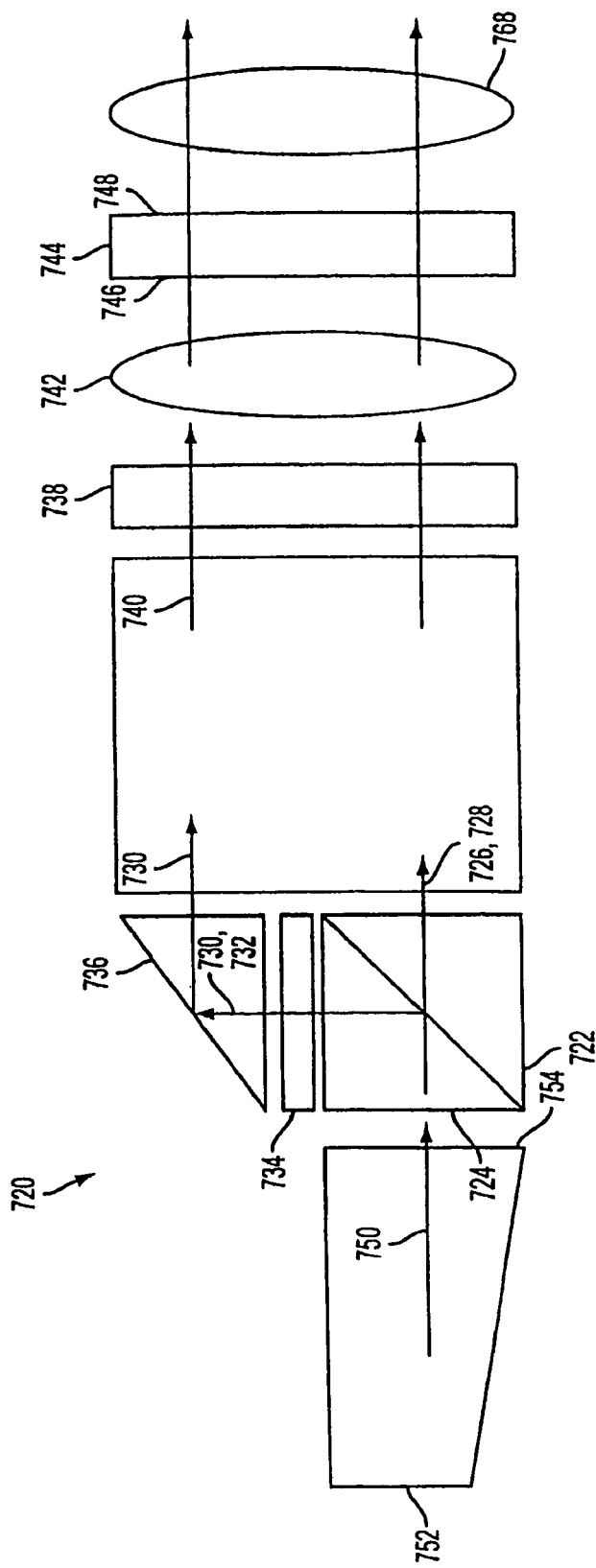
FIGS. 19A-19C shows a schematic diagram of a light pipe based projection engine according to a fifth embodiment of the invention.
Figure 19B:
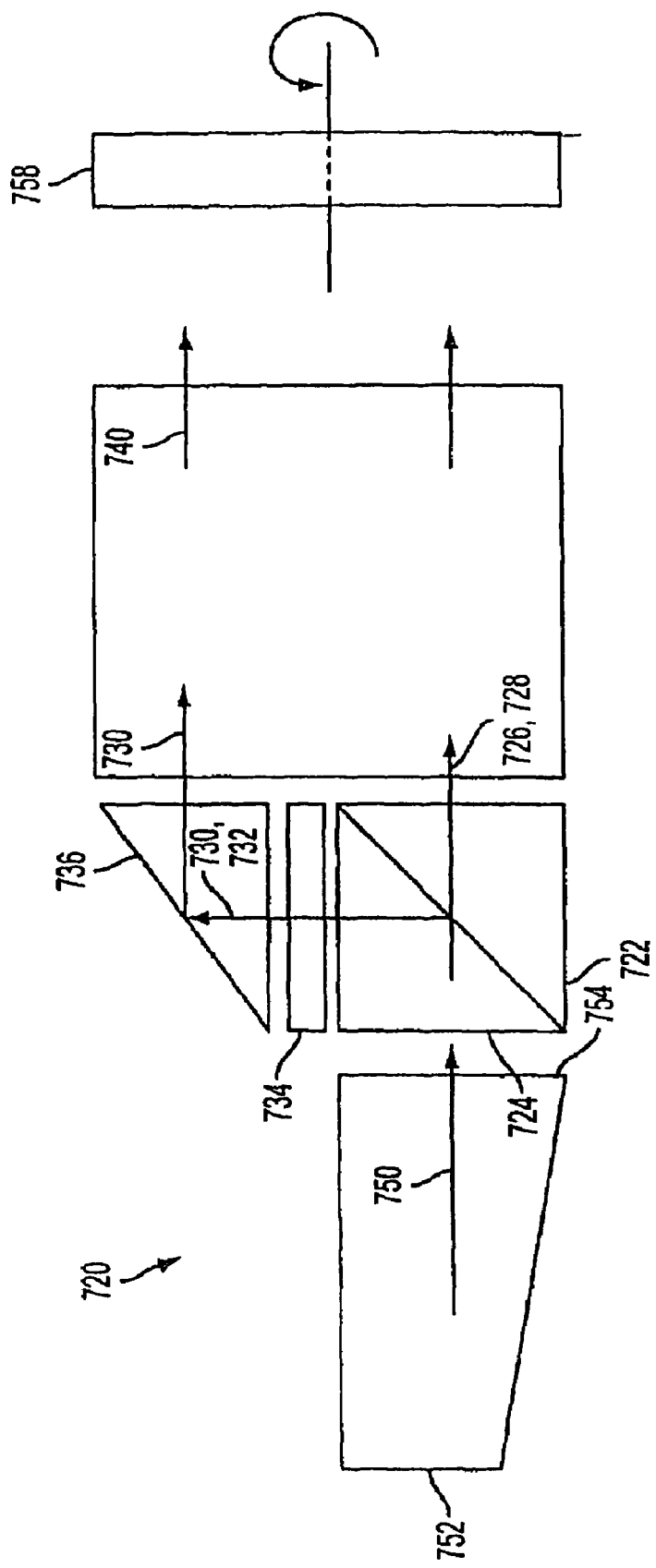
Figure 19C:
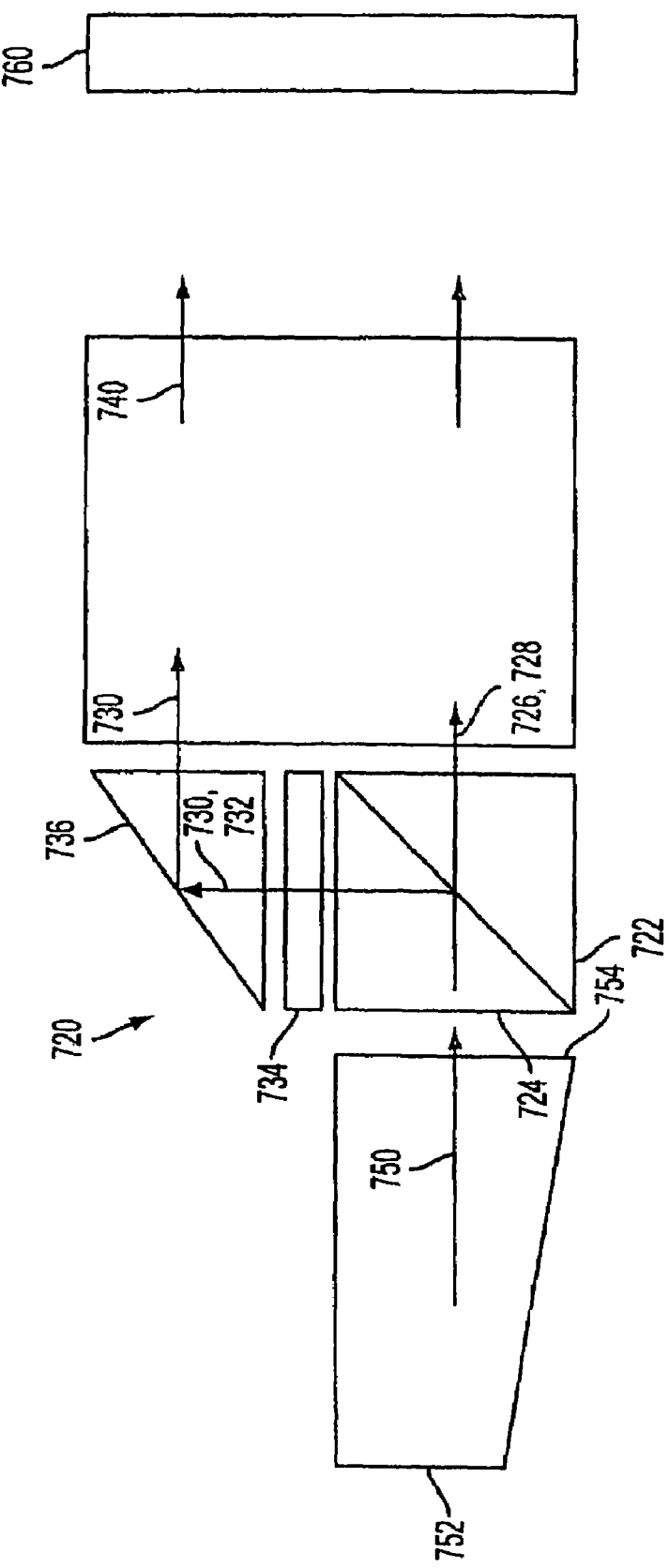

In another embodiment, shown in FIGS. 17-19, a supercube polarization recovery system is used without a half-wave plate. Several embodiments of a supercube-type polarization recovery system 700 are shown in FIGS. 17 and 18. Polarizing beam splitter 702 may separate unpolarized light from input light pipe 178 into light of a useful polarization 704 having a polarization 770, as shown in FIGS. 17A and 19A, and light of non-useful polarization 708 having a polarization 772, as shown in FIGS. 17B and 19B. Polarizing beam splitter 702 may transmit light of useful polarization 704 in an output direction 706 and reflect light of non-useful polarization 708 in a first orthogonal direction 710 substantially orthogonal to output direction 706. In one embodiment, polarization 770 may be substantially p-polarized, or horizontally polarized, light, while polarization 772 is substantially s-polarized, or vertically polarized, light. In an alternative embodiment, the planes of polarization may be reversed.

Light of useful polarization 704 may propagate through polarizing beam splitter 702 and be redirected by first output reflector 720 and second output reflector 722, exiting second output reflector 722 with polarization 770 unchanged, as shown in FIGS. 17A and 19A. Light of non-useful polarization 708, on the other hand, may be reflected by an initial reflector 714 after exiting polarizing beam splitter 702, as shown in FIGS. 17B and 19B. Initial reflector 714 may reflect light of non-useful polarization 708 about an axis substantially orthogonal to the plane of polarization 772 of light of non-useful polarization 708, which is in this case the s or vertical plane. Final reflector 718 may then reflect light of non-useful polarization 708 in a direction parallel to output direction 706. An inclined surface of initial reflector 714 may thus be rotated 90 degree with respect to final reflector 718. Although light of non-useful polarization 708 is still labeled light of non-useful polarization 708 for tracking purposes, it has become light of useful polarization, since the plane of polarization of light of non-useful polarization 708 is now horizontal, or p-polarized, to substantially match that of light of useful polarization 704. In one embodiment, both light of useful polarization 704 and light of non-useful polarization 708 may be coupled to output light pipe 732 and homogenized.

In one embodiment, a first output reflector 720 may be disposed reflectably to output direction 706. First output reflector 720 may reflect useful polarization light 704 in second orthogonal direction 716. In several embodiments, first output reflector 720 may be a mismatched impedance such as a prism, a right angle prism, or a mirror. In one embodiment, first output reflector 720 may have a coating that transmits a pre-determined portion of electromagnetic radiation spectrum. This might be used to discard unusable non-visible light before it is coupled into projection engine 100. In several embodiments, pre-determined portion of electromagnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, shown in FIG. 17A, a second output reflector 722 may be disposed reflectably to second orthogonal direction 716. Second output reflector 722 may reflect useful polarization light 704 in output direction 706. In another embodiment, shown in FIG. 24B, second output reflector 722 may be disposed reflectably to output direction 706. Second output reflector 722 may reflect non-useful polarization light 708 in second orthogonal direction 716. In several embodiments, second output reflector 722 may be a mismatched impedance such as a prism, a right angle prism, or a mirror. In one embodiment, second output reflector 722 may have a coating that transmits a pre-determined portion of electro-magnetic radiation spectrum. This might be used to discard unusable non-visible light before it is coupled into a projection engine 100. In several embodiments, pre-determined portion of electromagnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, initial reflector 714 may be disposed reflectably to first orthogonal direction 710. Initial reflector 714 may reflect non-useful polarization light 708 in a second orthogonal direction 716 substantially orthogonal to output direction 706 and first orthogonal direction 710. In several embodiments, initial reflector 714 may be a mismatched impedance such as a prism, a right angle prism, or a mirror. A mismatched impedance may reflect a wave, such as an electromagnetic wave, in the manner of an echo. A mismatched impedance, for example, may reflect part of a wave, or a range of wavelengths, while passing other parts of the wave, or other wavelengths.

In one embodiment, initial reflector 714 may have a coating that transmits a pre-determined portion of electromagnetic radiation spectrum. This might be used to discard unusable non-visible light before it is coupled into a projection engine 100. In several embodiments, pre-determined portion of electromagnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, final reflector 718 may be disposed reflectably to second orthogonal direction 716. Final reflector 718 may reflect non-useful polarization light 708 in output direction 706. In several embodiments, final reflector 718 may be a mismatched impedance such as a prism, a right angle prism, or a mirror. In one embodiment, final reflector 718 may have a coating that transmits a pre-determined portion of electromagnetic radiation spectrum. This might be used to discard unusable non-visible light before it is coupled into a projection engine. In several embodiments, pre-determined portion of electromagnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, polarization 772 of non-useful polarization light 708 may be rotated substantially to match polarization 770 of light of useful polarization 704 by initial and final reflectors 714 and 718. In this embodiment, first orthogonal direction 706 and second orthogonal direction 716 may lie substantially in a plane of polarization 772 of light of non-useful polarization 708. This basic block may be used to reflect and redirect light of non-useful polarization 708 from polarizing beam splitter 702 as described above such that polarization 772 of light of non-useful polarization 708 is converted to polarization 770 of light of useful polarization 704 and redirected to output direction 706.

In one embodiment, light of useful polarization 704 may exit polarizing beam splitter 702 in a different direction than that of light of non-useful polarization 708 after it has been redirected to output direction 706 by final reflector 718. In one embodiment, shown in FIG. 17A, first output reflector 720 and second output reflector 722 may be used to redirect light of useful polarization 704 in the same direction as light of non-useful polarization 708. In an alternative embodiment, first output reflector 720, shown in FIG. 19A, redirects light of useful polarization 704 while second output reflector 722, shown in FIG. 19B, redirects light of non-useful polarization 708 in the same direction as light of useful polarization 704. A spacer 746 may be used in either case to allow light of useful polarization 704 to exit at the same surface as light of non-useful polarization 708. This may be useful in order to couple light of useful polarization 704 and light of non-useful polarization 708 into output light pipe 732.

Figure 3:
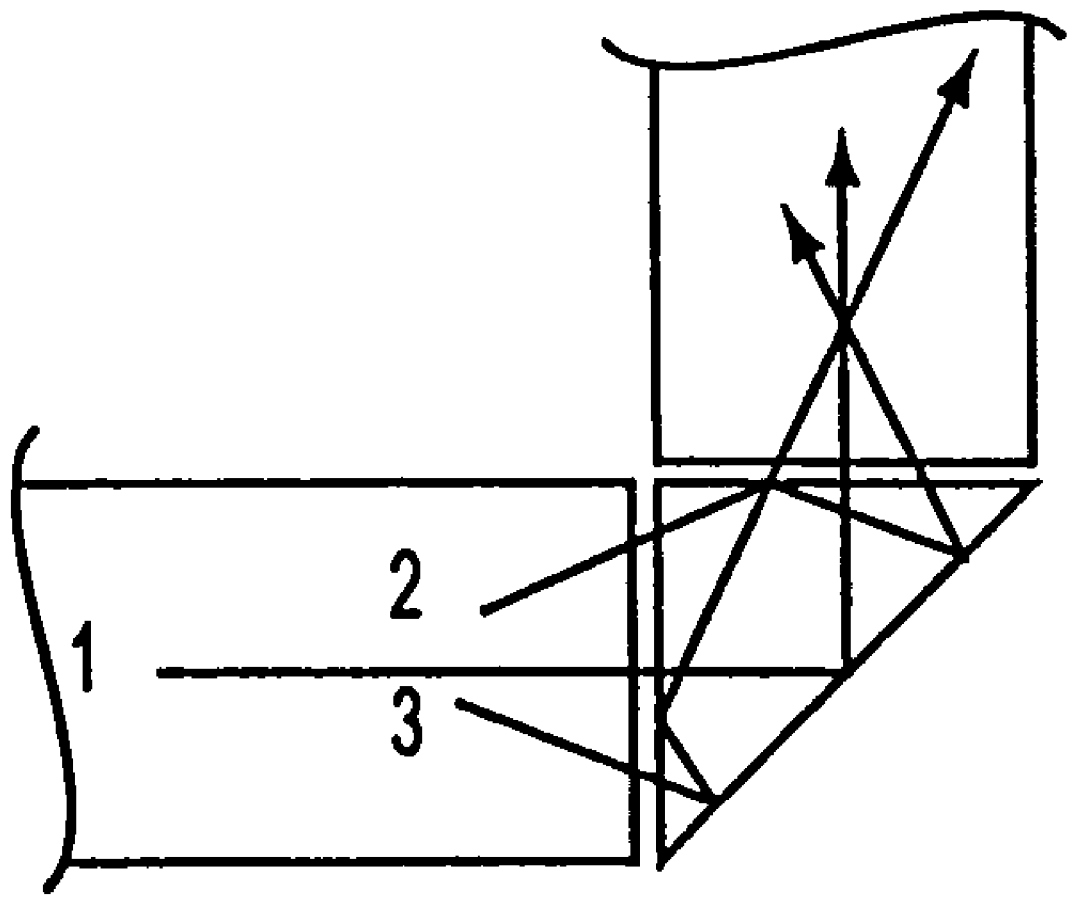
FIG. 3 shows a coupling element for use with an embodiment of the invention.

FIG. 3 shows the operation of the light pipe or glass block, and the right angle prisms. While ray 1 propagates in the middle of the light pipe and right angle prism, will travel without hitting the sidewall. On the other hand, ray 2 and ray 3 hits the sidewalls. The optional air gaps provide total internal reflections such that the rays will propagate with the same angle after reflection by the right angle prism as shown. Without the air gaps, these ray might have been lost to the outside of the light pipe and contribute to undesirable losses.

In one embodiment, an input light pipe 178 having an input surface 180 and an output surface 182 may be disposed proximate to input surface 202 of polarization recovery apparatus 200. Input light pipe 178 may receive substantially un-polarized light at input surface 180 and transmit un-polarized light at output surface 182 to polarizing beam splitter 208.

In FIG. 4 is shown another embodiment of a light pipe-based projection system in which a projection engine may be used in conjunction with a dual paraboloid reflector (DPR) system and a polarization recover system. Light output by a source of light, such as an arc lamp, is focused substantially by the dual paraboloid reflector system at an input of a light pipe, such as a tapered light pipe. The output of the tapered light pipe is then coupled into the light pipe based projection engine. Light of a rejected polarization may be converted to the proper polarization and combined with the original light of proper polarization using an integrator light pipe such that the output is polarized light with uniform intensity profile. This output may then be coupled into the projection engine as shown in FIG. 2A.

In another embodiment, the input to the projection system as shown in FIG. 2 and FIG. 4 can also be from the output of a parabolic reflector together with fly-eye lenses, PBS array and a focusing lens. The multiple images from each fly-eye is directed at the input of the projection systems.

Figure 2D:
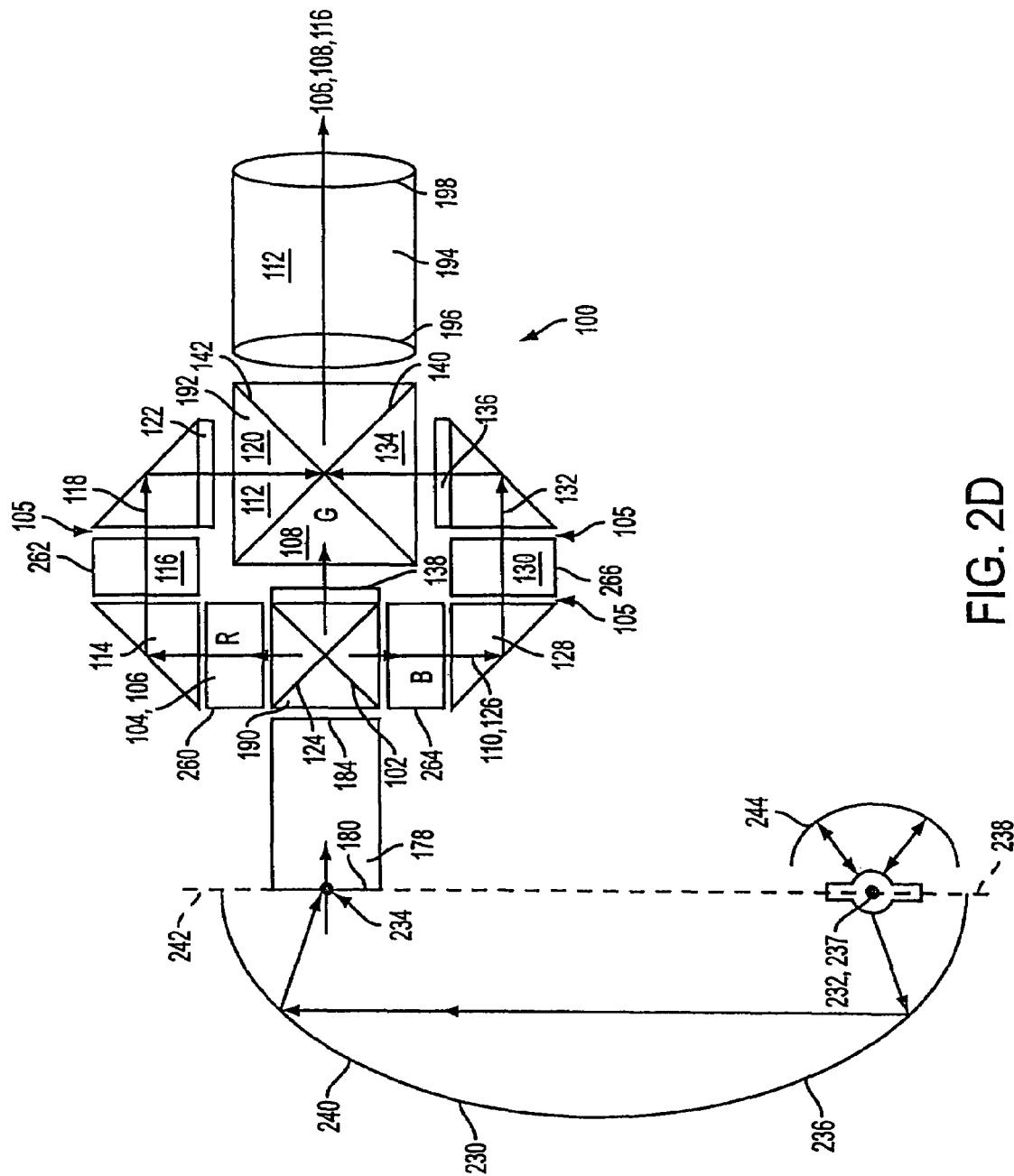

In particular, in one embodiment, shown in FIG. 2D, light pipe-based projection engine 100 may include a shell reflector 230 having a first and a second focal points 232, 234. In several embodiments, shell reflector 230 may be at least a portion of a shape such as a substantially elliptical surface of revolution, a substantially spherical surface of revolution, or a substantially toric surface of revolution. In several embodiments, shell reflector 230 has a coating that transmits a pre-determined portion of electromagnetic radiation spectrum such as infrared light, visible light, a pre-determined band of wavelengths of light, a specific color of light, and a combination thereof.

In one embodiment, shell reflector 230 may include a primary reflector 236 having a first optical axis 238, and first focal point 232 may be a focal point of primary reflector 236. Shell reflector 230 may also include a secondary reflector 240 having a second optical axis 242 placed substantially symmetrically to primary reflector 236 such that first and second optical axes 238, 242 are substantially collinear. In one embodiment, second focal point 234 is a focal point of secondary reflector 240. In one embodiment, rays of light reflect from primary reflector 236 toward secondary reflector 240 and converge substantially at second focal point 234. In several embodiments, primary and secondary reflectors 236, 240 each comprise at least a portion of a shape such as a substantially elliptical surface of revolution or a substantially parabolic surface of revolution.

In one embodiment, primary reflector 236 may be at least a portion of a substantially elliptical surface of revolution, and secondary reflector 240 may be at least a portion of a substantially hyperbolic surface of revolution. In one embodiment, primary reflector 236 may be at least a portion of a substantially hyperbolic surface of revolution, and secondary reflector 240 may be at least a portion of a substantially elliptical surface of revolution.

A source 237 of electromagnetic radiation may be disposed proximate to first focal point 232 of shell reflector 230 to emit rays of light that reflect from shell reflector 230 and converge substantially at second focal point 234. In one embodiment, source 237 of electromagnetic radiation may be an arc lamp. In several embodiments, arc lamp may be a lamp such as a xenon lamp, a metal halide lamp, a UHP lamp, a HID lamp, or a mercury lamp. In several embodiments, source 237 of electromagnetic radiation may be a halogen lamp, and a filament lamp. In one embodiment, low and high distributing reflectors 102, 124 may be disposed proximate to second focal point 234 to collect and transmit substantially all of the light. In alternative embodiments, input surface 180 of input light pipe 178 or input surface 202 of polarization recovery apparatus 200 may be disposed proximate to second focal point 234 to collect and transmit substantially all of the light.

In one embodiment, light pipe-based projection engine 100 may also include a retro-reflector 244 may be disposed on a side of source 237 opposite shell reflector 230. In one embodiment, retro-reflector 244 may be a spherical retro-reflector 244. In several embodiments, retro-reflector 244 has a coating that transmits a pre-determined portion of electromagnetic radiation spectrum such as infrared light, visible light, a pre-determined band of wavelengths of light, a specific color of light, and a combination thereof.

In one embodiment, light pipe-based projection engine 100 may include an image projection apparatus 246 disposed proximate to output direction 112 to collect substantially light of low, medium, and high bands of wavelengths 106, 108, 110. In several embodiments, image projection apparatus 246 may be an LCOS imager, a DMD chip, or a transmissive LCD panel.

FIGS. 4 and 5 show another embodiment of this invention in which three LCD panels form three color images. The three color images are projected separately onto a screen using three separate projection lenses. The input white light enters low reflector 348 where the first color is reflected towards the LCD3 and the image is projected to the screen through low projection lens 378. The un-reflected light of the second and third colors passing through low reflector 348 will continue to be guided by LG2, will then be reflected by medium reflector 352, in which the second color will be reflected and directed towards LCD2 and projected on the screen through medium projection lens 380. The remaining third color continues to be guided by LG1, will be reflected by high reflector 356, through LCD1, and eventually projected onto the screen through high projection lens 382. The lens and LCD panels are aligned such that all three images match substantially on the screen to form a color image.

In particular, in a second embodiment, shown in FIGS. 4 and 5, a light pipe-based projection engine 300 may include a low reflector 348 reflecting substantially light of a low band of wavelengths 104 in a low direction 350 and transmitting substantially light of a medium and a high bands of wavelengths 106, 108 in an output direction 312. In several embodiments, low reflector 348 may be a prism, an acute angle, right angle, or obtuse angle prism, a mismatched impedance, or a mirror. In one embodiment, light pipe-based projection engine 300 may include a low projection lens 378 disposed in low direction 350 to collect and focus light of low band of wavelengths 104.

A medium reflector 352 may receive light of medium and high bands of wavelengths 108, 110 and reflect substantially light of medium band of wavelengths 108 in a medium direction 354 and transmit substantially light of high band of wavelengths 110 in output direction 312. In several embodiments, medium reflector 352 may be a prism, an acute angle, right angle, or obtuse angle prism, a mismatched impedance, or a mirror. A medium projection lens 380 may be disposed in medium direction 354 to collect and focus light of medium band of wavelengths 108.

In one embodiment, light pipe-based projection engine 100 may include an initial light pipe 384 to receive light of medium and high bands of wavelengths 108, 110 from low reflector 348 and transmit substantially light of medium and high bands of wavelengths 108, 110 to medium reflector 352. In several embodiments, initial light pipe 384 may be made of a material such as quartz, glass, plastic, or acrylic. In several embodiments, initial light pipe 384 may be a straight light pipe or a tapered light pipe, as shown in FIGS. 15A-15C.

A high reflector 356 may receive light of high band of wavelengths 110 and reflect substantially light of high band of wavelengths 110 in a high direction 358. In several embodiments, high reflector 356 may be a prism, an acute angle, right angle, or obtuse angle prism, a mismatched impedance, or a mirror. A high projection lens 382 may be disposed in high direction 358 to collect and focus light of high band of wavelengths 110.

In one embodiment, light pipe-based projection engine 100 may include a final light pipe 386 to receive light of high band of wavelengths 110 from medium reflector 352 and transmit substantially light of high band of wavelengths 110 to high reflector 356. In several embodiments, final light pipe 386 may be made of a material such as quartz, glass, plastic, or acrylic. In several embodiments, final light pipe 386 may be a straight light pipe or a tapered light pipe, as shown in FIGS. 15A-15C.

In one embodiment, shown in FIG. 5, light pipe-based projection engine 300 may include input light pipe 178 having input surface 180 and output surface 182. Output surface 182 may be disposed substantially proximate to low reflector 348. Input light pipe 178 may receive light at input surface 180 and transmit substantially light at output surface 182 to low reflector 348.

In another embodiment, light pipe-based projection engine 300 may also include a polarization recovery apparatus 200. Polarization recovery apparatus 200 may be disposed substantially proximate to low reflector 348. Polarization recovery apparatus 200 may receive substantially un-polarized light at an input surface 202 and transmit substantially light of a useful polarization 206 at an output surface 204 to low reflector 348.

In this embodiment, output surface 204 of polarization recovery apparatus 200 may be disposed proximate to input light pipe 178, input light pipe 178 receiving substantially polarized light at input surface 180 and transmitting polarized light at output surface 182 to low reflector 348.

In one embodiment, light pipe-based projection engine 300 may include a shell reflector 230 having a first and a second focal points 232, 234. A source 237 of electromagnetic radiation may be disposed proximate to first focal point 232 of shell reflector 230 to emit rays of light that reflect from shell reflector 230 and converge substantially at second focal point 234. In several embodiments, input surface 202 of polarization recovery apparatus 200 or input surface 180 of input light pipe 178 may be disposed proximate to second focal point 234 to collect and transmit substantially all of light. In one embodiment, light pipe-based projection engine 300 may also include a retro-reflector 244 disposed on a side of source 237 opposite shell reflector 230.

Figure 13A:
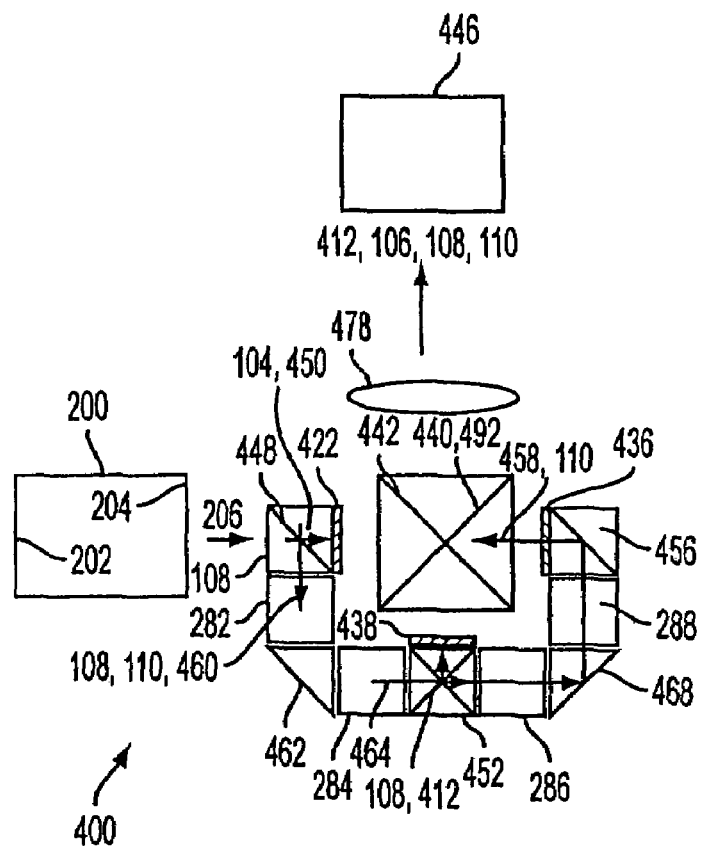
FIG. 13A shows a schematic diagram of a light pipe based projection engine according to a third embodiment of the invention.

FIG. 13 shows other embodiments where light pipes, prisms, and beam splitters are used to form the color system of the projection engine. In FIG. 13(a), the input white light is incident on a beam splitter where the red light is transmitted to the R-imager. The green and blue light is reflected, propagates through the light pipe, and is turned 90 degrees. The green and blue light is split further in the second beam splitter so that the green and blue light takes separate paths. The green light is reflected to the G-imager. The blue light continues to propagate to the B-imager through the rest of the light pipes and prisms.

In particular, in a third embodiment, shown in FIG. 13(a), a light pipe-based projection engine 400 may include a low reflector 448 transmitting substantially light of a low band of wavelengths 104 in a low direction 450 and reflecting substantially light of a medium and a high bands of wavelengths 108, 110 in a first perimeter direction 460. In several embodiments, low reflector 448 may be a prism, an acute angle, right angle, or obtuse angle prism, a mismatched impedance, or a mirror. A low modulator 422 may be disposed in low direction 450 to modulate substantially light of low band of wavelengths 104.

A first perimeter reflector 462 may be disposed reflectably to first perimeter direction 460 to reflect substantially light of medium and high bands of wavelengths 108, 110 in a second perimeter direction 464. In several embodiments, first perimeter reflector 462 may be a prism, an acute angle, right angle, or obtuse angle prism, a mismatched impedance, or a mirror.

In one embodiment, light pipe-based projection engine 400 may include a low light pipe 282 to receive light of medium and high bands of wavelengths 108, 110 from low reflector 448 and transmit substantially light of medium and high bands of wavelengths 108, 110 to first perimeter reflector 462. In several embodiments, low light pipe 282 may be made of a material such as quartz, glass, plastic, or acrylic. In several embodiments, low light pipe 282 may be a straight light pipe or a tapered light pipe, as shown in FIGS. 15A-15C.

A medium reflector 452 may be disposed reflectably to second perimeter direction 464, medium reflector 452 receiving light of medium and high bands of wavelengths 108, 110, reflecting substantially light of medium band of wavelengths 108 in an output direction 412 and transmitting substantially light of high band of wavelengths 110 in second perimeter direction 464. In several embodiments, medium reflector 452 may be a prism, an acute angle, right angle, or obtuse angle prism, a mismatched impedance, or a mirror. A medium modulator 438 may be disposed in output direction 412 to modulate substantially light of medium band of wavelengths 108.

In one embodiment, light pipe-based projection engine 400 may include a medium initial light pipe 284 to receive light of medium and high bands of wavelengths 108, 110 from first perimeter reflector 462 and transmit substantially light of medium and high bands of wavelengths 108,110 to medium reflector 452. In several embodiments, medium initial light pipe 284 may be made of a material such as quartz, glass, plastic, or acrylic. In several embodiments, medium initial light pipe 284 may be a straight light pipe or a tapered light pipe, as shown in FIGS. 15A-15C.

A second perimeter reflector 468 may be disposed reflectably to second perimeter direction 464 to reflect substantially light of high band of wavelengths 110 in a third perimeter direction 466. In several embodiments, second perimeter reflector 468 may be a prism, an acute angle, right angle, or obtuse angle prism, a mismatched impedance, or a mirror.

In one embodiment, light pipe-based projection engine 400 may include a medium final light pipe 286 to receive light of high band of wavelengths 110 from medium reflector 452 and transmit substantially high band of wavelengths 110 to second perimeter reflector 468. In several embodiments, medium final light pipe 286 may be made of a material such as quartz, glass, plastic, or acrylic. In several embodiments, medium final light pipe 286 may be a straight light pipe or a tapered light pipe, as shown in FIGS. 15A-15C.

A high reflector 456 may be disposed reflectably to third perimeter direction 466, high reflector 456 receiving light of high band of wavelengths 110 and reflecting substantially light of high band of wavelengths 110 in a high direction 458. In several embodiments, high reflector 456 may be a prism, an acute angle, right angle, or obtuse angle prism, a mismatched impedance, or a mirror. A high modulator 436 may be disposed in high direction 458 to modulate substantially light of high band of wavelengths 110.

In one embodiment, light pipe-based projection engine 400 may include a high light pipe 288 to receive light of high band of wavelengths 110 from second perimeter reflector 468 and transmit substantially high band of wavelengths 110 to high reflector 456. In several embodiments, high light pipe 288 may be made of a material such as quartz, glass, plastic, or acrylic. In several embodiments, high light pipe 288 may be a straight light pipe or a tapered light pipe, as shown in FIGS. 15A-15C.

A low combining reflector 440 may reflect substantially light of low band of wavelengths 104 in output direction 412 and transmit substantially light of medium and high bands of wavelengths 108, 110. A high combining reflector 442 may reflect substantially light of high band of wavelengths 110 in output direction 412 and transmit substantially light of low and medium bands of wavelengths 106, 108.

In several embodiments, low and high combining reflectors 440, 442 comprise a combining X-prism 492. In one embodiment, light pipe-based projection engine 400 may also include a projection lens 478 disposed in output direction 412 to collect and focus light of low, medium, and high bands of wavelengths 106, 108, 110.

In one embodiment, light pipe-based projection engine 400 may also include a polarization recovery apparatus 200, polarization recovery apparatus 200 may be disposed substantially proximate to low reflector 448, polarization recovery apparatus 200 receiving substantially un-polarized light at an input surface 202 and transmitting substantially light of a useful polarization 206 at an output surface 204 to low reflector 448.

In one embodiment, light pipe-based projection engine 400 may include an input light pipe 178 having an input surface 180 and an output surface 182, output surface 182 may be disposed substantially proximate to low reflector 448, input light pipe 178 receiving light at input surface 180 and transmitting substantially light at output surface 182 to low reflector 448. In another embodiment, input light pipe 178 may be disposed proximate to input surface 202 of polarization recovery apparatus 200, input light pipe 178 receiving substantially un-polarized light at input surface 180 and transmitting un-polarized light at output surface 182 to polarizing beam splitter 208.

In one embodiment, light pipe-based projection engine 400 may include a shell reflector 230 having a first and a second focal points 232, 234, a source 237 of electro-magnetic radiation may be disposed proximate to first focal point 232 of shell reflector 230 to emit rays of light that reflect from shell reflector 230 and converge substantially at second focal point 234. In one embodiment, light pipe-based projection engine 400 may also include a retro-reflector 244 may be disposed on a side of source 237 opposite shell reflector 230. In one embodiment, low reflector 448 is may be disposed proximate to second focal point 234 to collect and transmit substantially all of light. In alternative embodiments, input surface 180 of input light pipe 178 or input surface 202 of polarization recovery apparatus 200 may be disposed proximate to second focal point 234 to collect and transmit substantially all of the light.

In one embodiment, light pipe-based projection engine 400 may include an image projection apparatus 446 disposed proximate to output direction 412 to collect substantially light of low, medium, and high bands of wavelengths 106, 108, 110. In several embodiments, image projection apparatus 446 may be an LCOS imager, a DMD chip, or a transmissive LCD panel.

Figure 10:
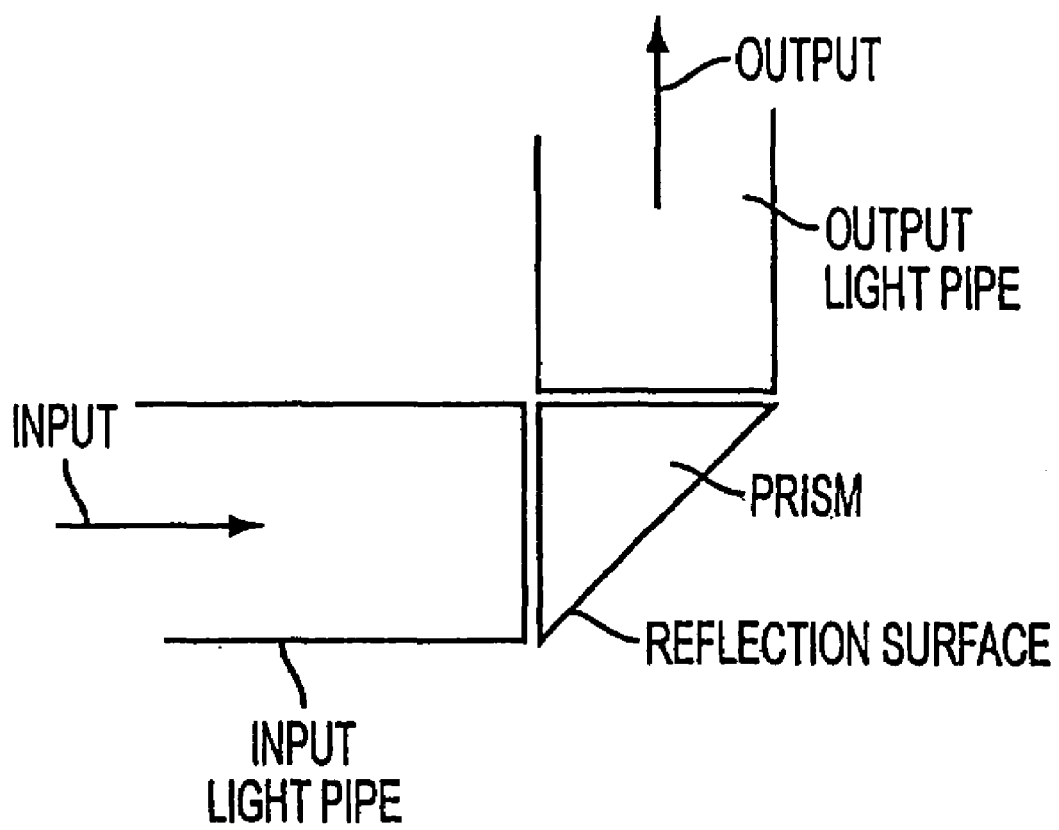
FIG. 10 shows a right angle prism for use with an embodiment of the invention.

In the above embodiments, a direction of propagation of light can be turned 90 degrees using light pipes and right angle prisms, as shown in FIG. 10. A reflective surface at the hypotenuse of the right angle prism can be uncoated. If the reflective surface is uncoated, reflection of light may be done by total internal reflection. In the alternative, the reflective surface at the hypotenuse of the right angle prism can be coated with metal or a dielectric coating. Air gaps between input light pipe 178, prism, and output light pipe may provide total internal reflections for the light being reflected as well. The surfaces on both sides of each air gap are usually coated with an anti-reflection for reduced losses.

Figure 11A:
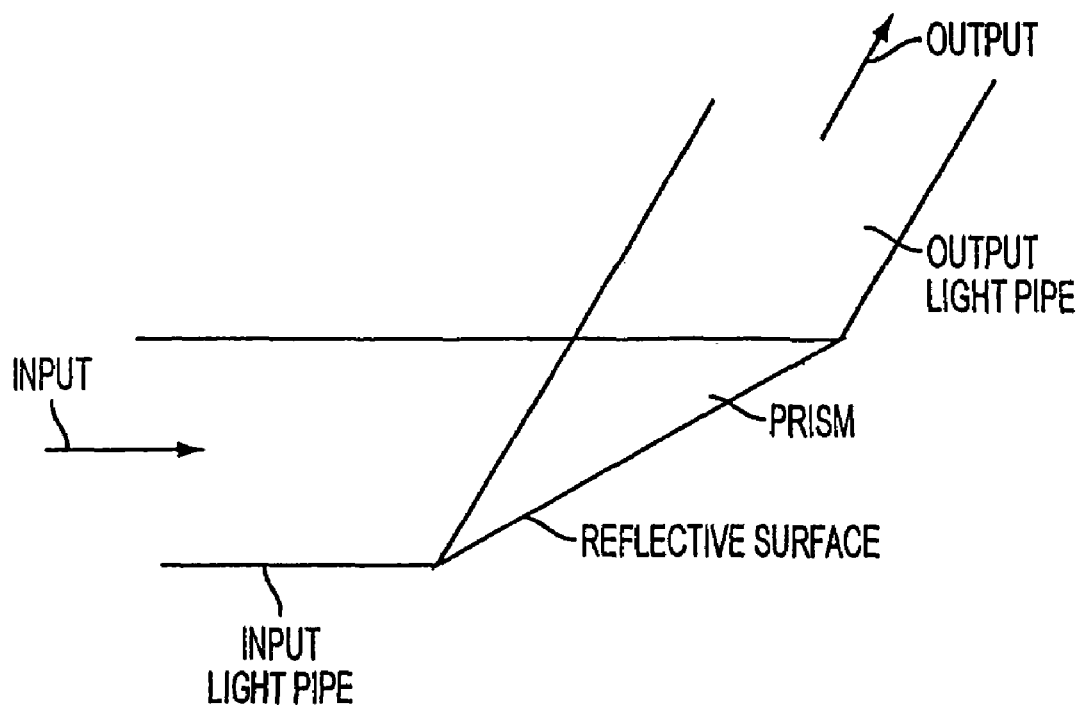
FIGS. 11A and B shows acute and obtuse prisms for use with an embodiment of the invention.
Figure 11B:
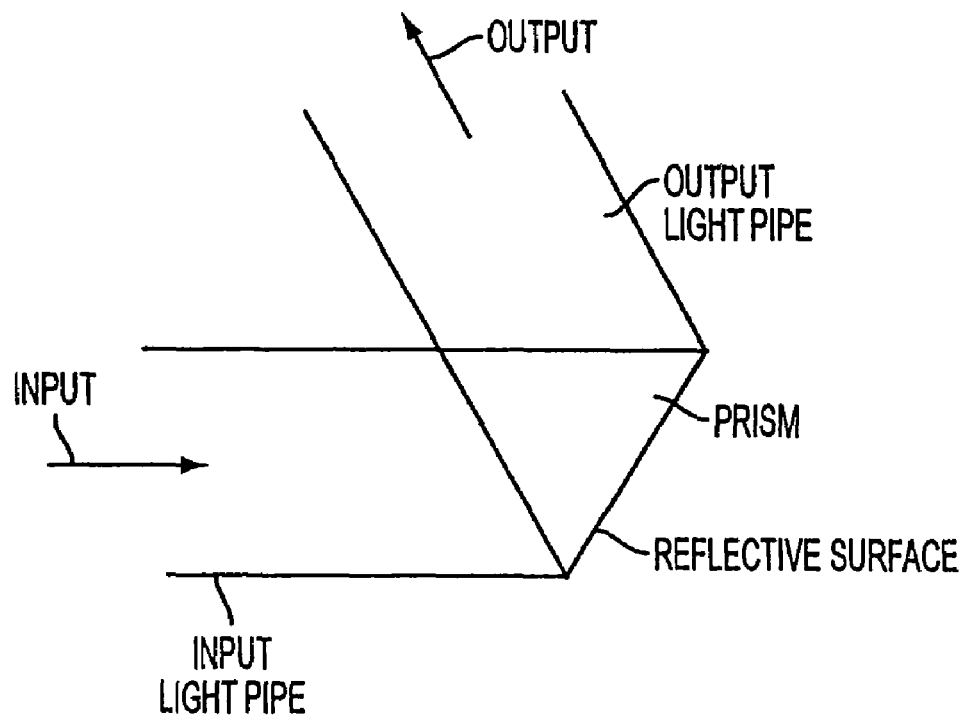

In general, the direction of propagation can be changed by amounts other than 90 degrees as well. FIG. 11(a) shows an embodiment in which an angle between the components is obtuse, i.e. the direction is changed by more than 90 degrees. FIG. 11(b) shows another embodiment in which an angle between the components is acute, i.e. the direction is changed by less than 90 degrees. In both cases, the dimensions of the prism are derived by overlapping the input and output waveguides and dividing the resulting trapezoidal prism in half, as shown in both cases. The reflective surfaces may be coated or uncoated depending on the angle between the two light pipes, and the numerical aperture of the light inside the waveguide. Similarly, the air gaps between the light pipes and the prism may also be used to provide total internal reflection.

Depending on the angle between the input and output light pipes, the numerical aperture of the light inside each component will be constrained by the total internal reflection of the surfaces around the air gap.

For a system where the light has a divergence of F/2.4 (divergence angle of 12 degrees in air and is 8 degrees in the glass light pipe) and the light pipe and prism have an index of 1.5 (critical angle of 41.8 degrees), the maximum angle that output light pipe 184 can deviate from the 90 degrees will be 33.8 degrees, which is the difference between the critical angle and the divergence angle.

Figure 12:
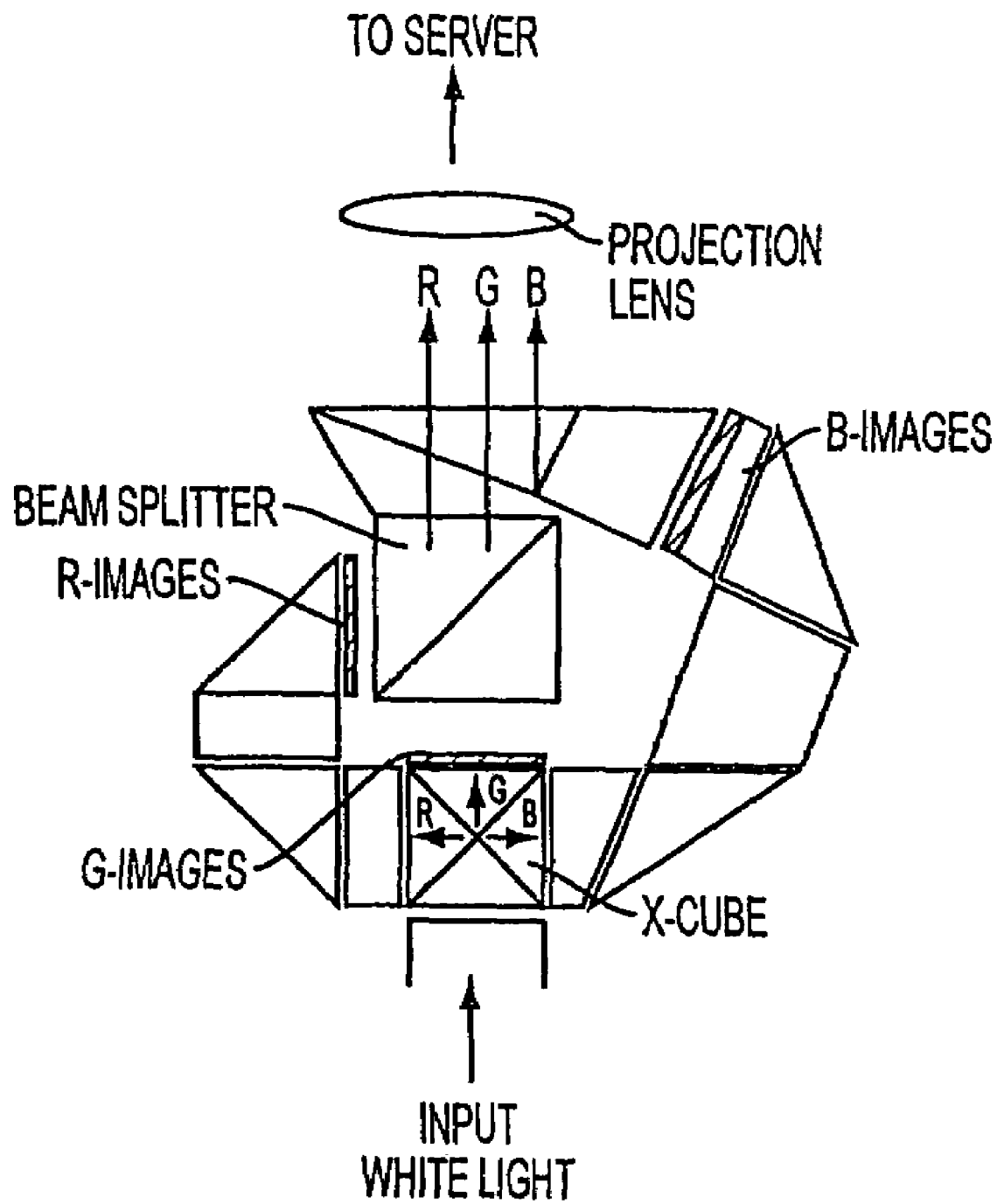
FIG. 12 shows a schematic diagram of a light pipe based projection engine according to an embodiment of the invention.

FIG. 12 shows another embodiment of a projection engine in which distributing X-prism 190 has been replaced by a beam splitter and two prisms. The advantage of this system is that there is substantially no discontinuity in the path of the blue light between the imagers and the projection lens. The trade off is the addition of more components. In this case, the illuminations of the red and green imagers are the same as before. The light path for the blue is changed. Since the plane of the B-imager is not parallel or perpendicular to the other light pipes and prisms, an angled light pipe and prism is used as shown in the figure. In this case, a light pipe tilted at an angle is used with the corresponding prism. The angle is also chosen to be within the operating range as described above. The space requirement is also small compared to the original system with mirrors and filters.

In another embodiment, not shown in diagrams, the numerical aperture of the light inside the light pipes up to the imager chips can be different from the acceptance angle of the imager chips. A tapered light pipe can be placed at each imager chip so as to convert the aperture size and the numerical aperture of the incoming light matching to the size and acceptance angle of the imager chip. These added components can give flexibility to the design of the system.

In a preferred embodiment, the light source is an arc lamp placed inside a dual paraboloid reflector system with a tapered light pipe at the output. The output of the light pipe is matched with the input of this light pipe illumination system in both the dimensions and the numerical aperture. Polarizers can be added at the imager locations for spatial modulation.

In another embodiment, the output of the tapered light pipe can be directed to a light pipe based polarization recovery system where the unused polarization is converted to usable polarization. The output of the polarization recovery system is then directed into the light pipe illumination system.

In another embodiment, an elliptical reflector system is used where the focused light is directed into the input of the light pipe illumination system. In another embodiment, the focused light is directed into the input of the light pipe based polarization recovery system as described above such that the output polarized light is directed into the light pipe illumination system.

Yet in another embodiment, a parabolic reflector system is used together with the fly-eye lenses and polarization beam splitter array such that a focused, polarized light spot with the proper size and numerical aperture is directed to the input of the light pipe illumination system.

Figure 13B:
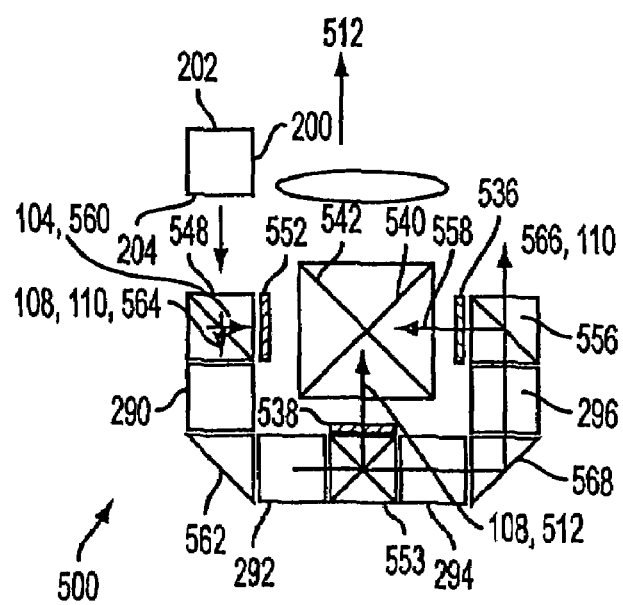
FIG. 13B shows a schematic diagram of a light pipe based projection engine according to a fourth embodiment of the invention.

In another embodiment, shown in FIG. 13(b), the input light enters from a direction substantially orthogonal to that shown in FIG. 13(a). In particular, in a fourth embodiment, shown in FIG. 13(b), a light pipe-based projection engine 500 may include a low reflector 548 transmitting substantially light of a low band of wavelengths 104 in a first perimeter direction 560 and reflecting substantially light of a medium and a high bands of wavelengths 108, 110 in a second perimeter direction 564. In several embodiments, low reflector 548 may be a prism, an acute angle, right angle, or obtuse angle prism, a mismatched impedance, or a mirror.

A first perimeter reflector 562 may be disposed reflectably to second perimeter direction 564 to reflect substantially light of medium and a high bands of wavelengths 108, 110 in a third perimeter direction 550. In several embodiments, first perimeter reflector 562 may be a prism, an acute angle, right angle, or obtuse angle prism, a mismatched impedance, or a mirror. A low modulator 522 may be disposed in low direction 560 to modulate substantially light of low band of wavelengths 104.

In one embodiment, light pipe-based projection engine 500 may include a low light pipe 290 to receive light of medium and high bands of wavelengths 108, 110 from low reflector 548 and transmit substantially light of medium and high bands of wavelengths 108, 110 to first perimeter reflector 562. In several embodiments, low light pipe 290 may be made of a material such as quartz, glass, plastic, or acrylic. In several embodiments, low light pipe 290 may be a straight light pipe or a tapered light pipe, as shown in FIGS. 15A-15C.

A medium reflector 553 may be disposed reflectably to third perimeter direction 550, medium reflector 553 receiving light of medium and high bands of wavelengths 108, 110 and reflecting substantially light of medium band of wavelengths 108 in an output direction 512 and transmitting substantially light of high band of wavelengths 110 in third perimeter direction 550. In several embodiments, medium reflector 552 may be a prism, an acute angle, right angle, or obtuse angle prism, a mismatched impedance, or a mirror. A medium modulator 538 may be disposed in output direction 512 to modulate substantially light of medium band of wavelengths 108.

In one embodiment, light pipe-based projection engine 500 may include a medium initial light pipe 292 to receive light of medium and high bands of wavelengths 108, 110 from first perimeter reflector 562 and transmit substantially light of medium and high bands of wavelengths 108, 110 to medium reflector 552. In several embodiments, medium initial light pipe 292 may be made of a material such as quartz, glass, plastic, or acrylic. In several embodiments, medium initial light pipe 292 may be a straight light pipe or a tapered light pipe, as shown in FIGS. 15A-15C.

A second perimeter reflector 568 may be disposed reflectably to third perimeter direction 550 to reflect substantially light of high band of wavelengths 110 in a fourth perimeter direction 566. In several embodiments, second perimeter reflector 568 may be a prism, an acute angle, right angle, or obtuse angle prism, a mismatched impedance, or a mirror.

In one embodiment, light pipe-based projection engine 500 may include a medium final light pipe 294 to receive light of high band of wavelengths 110 from medium reflector 552 and transmit substantially high band of wavelengths 110 to second perimeter reflector 568. In several embodiments, medium final light pipe 294 may be made of a material such as quartz, glass, plastic, or acrylic. In several embodiments, medium final light pipe 294 may be a straight light pipe or a tapered light pipe, as shown in FIGS. 15A-15C.

A high reflector 556 may be disposed reflectably to third perimeter direction 566, high reflector 556 receiving light of high band of wavelengths 110 and reflecting substantially light of high band of wavelengths 110 in a high direction 558. In several embodiments, high reflector 556 may be a prism, an acute angle, right angle, or obtuse angle prism, a mismatched impedance, or a mirror. A high modulator 536 may be disposed in high direction 558 to modulate substantially light of high band of wavelengths 110.

In one embodiment, light pipe-based projection engine 500 may include a high light pipe 296 to receive light of high band of wavelengths 110 from second perimeter reflector 568 and transmit substantially high band of wavelengths 110 to high reflector 556. In several embodiments, high light pipe 296 may be made of a material such as quartz, glass, plastic, or acrylic. In several embodiments, high light pipe 296 may be a straight light pipe or a tapered light pipe, as shown in FIGS. 15A-15C.

A low combining reflector 540 may reflect substantially light of low band of wavelengths 104 in output direction 512 and transmit substantially light of medium and high bands of wavelengths 108, 110. A high combining reflector 542 may reflect substantially light of high band of wavelengths 110 in output direction 512 and transmit substantially light of low and medium bands of wavelengths 106, 108. In one embodiment, low and high combining reflectors 540, 542 comprise a combining X-prism 592. In one embodiment, light pipe-based projection engine 500 may also include a projection lens 578 disposed in output direction 512 to collect and focus light of low, medium, and high bands of wavelengths 106, 108, 110.

In one embodiment, light pipe-based projection engine 500 may also include a polarization recovery apparatus 200. Polarization recovery apparatus 200 may be disposed substantially proximate to low reflector 548, polarization recovery apparatus 200 receiving substantially un-polarized light at an input surface 202 and transmitting substantially light of a useful polarization 206 at an output surface 204 to low reflector 548.

In particular, in one embodiment, light pipe-based projection engine 500 may include an input light pipe 178 having an input surface 180 and an output surface 182. Output surface 182 may be disposed substantially proximate to low reflector 548. Input light pipe 178 may receive light at input surface 180 and transmit substantially light at output surface 182 to low reflector 548. In another embodiment, input light pipe 178 may be disposed proximate to input surface 202 of polarization recovery apparatus 200, input light pipe 178 receiving substantially un-polarized light at input surface 180 and transmitting un-polarized light at output surface 182 to polarizing beam splitter 208.

In one embodiment, light pipe-based projection engine 500 may include a lens 584, such as a projection lens, disposed proximate to output direction 512 to focus substantially light of low, medium, and high bands of wavelengths 106, 108, 110. In several embodiments, a shape of lens 584 may be a flat, convex, concave, toroidal, and spherical. In several embodiments, lens 584 may be made of a material such as quartz, glass, plastic, or acrylic.

In another embodiment, an output light pipe 184 having an input surface 186 and an output surface 188 may be disposed proximate to output direction 512. In this embodiment, output light pipe 184 receives light at input surface 186 and transmits substantially light at output surface 188.

In one embodiment, light pipe-based projection engine 500 may include a shell reflector 230 having a first and a second focal points 232, 234. A source 237 of electromagnetic radiation may be disposed proximate to first focal point 232 of shell reflector 230 to emit rays of light that reflect from shell reflector 230 and converge substantially at second focal point 234. In one embodiment, light pipe-based projection engine 500 may also include a retro-reflector 244 may be disposed on a side of source 237 opposite shell reflector 230 In one embodiment, low reflector 548 is may be disposed proximate to second focal point 234 to collect and transmit substantially all of light. In alternative embodiments, input surface 180 of input light pipe 178 or input surface 202 of polarization recovery apparatus 200 may be disposed proximate to second focal point 234 to collect and transmit substantially all of the light.

In one embodiment, light pipe-based projection engine 500 may include an image projection apparatus 246 may be disposed proximate to output direction 512 to collect substantially light of low, medium, and high bands of wavelengths 106, 108, 110.

In several embodiments, image projection apparatus 246 may be an LCOS imager, a DMD chip, or a transmissive LCD panel.

In general, besides using the dual paraboloid reflector system, other system including an elliptical reflector with or without output light pipes, paraboloid reflectors with a focusing lens with or without output light pipes, can be used. Furthermore, an illumination system not shown, with a parabolic reflector with fly eye lens and PBS arrays can also be used. The output of the whole system is focused onto the input of the light pipe based color separation system.

In a fifth embodiment, shown in FIG. 19A, a light pipe-based projection engine 720 may include a polarizing beam splitter 722 receiving substantially un-polarized light at an input surface 724. Polarizing beam splitter 722 transmits first light energy 726 of a useful polarization in an output direction 728 and reflects second light energy 730 of a non-useful polarization in a recovery direction 732. A wave plate 734 may be disposed in recovery direction 732 to receive and modify the polarization of a substantial portion of the second light energy 730 to useful polarization. A recovery reflector 736 may be disposed reflectably to recovery direction 732 to reflect second light energy 730 in output direction 728. A modulator 738 may be disposed in output direction 728 to modulate substantially first light energy 726 and second light energy 730. An initial light pipe 740 may be disposed in output direction 728 to receive first light energy 726 from polarization beam splitter and second light energy 730 from recovery reflector 736 and transmit first and second light energies to modulator 738.

In one embodiment, light pipe-based projection engine 720 may include a lens 742 disposed proximate to output direction 728 to focus substantially first and second light energies 726, 730. An output light pipe 744 having an input surface 746 and an output surface 748 may be disposed proximate to output direction 728. Output light pipe 744 may receive first and second light energies 726, 730 at input surface 746 and transmit substantially first and second light energies 726, 730 at output surface 748. A projection lens 768 may be disposed in output direction 728 to collect and focus first and second light energies 726, 730. In one embodiment, light pipe-based projection engine 720 may include an input light pipe 750 having an input surface 752 and an output surface 754, output surface 754 disposed proximate to input face 756 of polarizing beam splitter 722, input light pipe 750 receiving substantially un-polarized light at input surface 752 and transmitting un-polarized light at output surface 754 to polarizing beam splitter 722. In one embodiment, shown in FIG. 19B, light pipe-based projection engine 720 may include a color wheel 758 disposed proximate to output direction 728 to provide sequential color substantially to first and second light energies 726, 730. In one embodiment, shown in FIG. 19C, light pipe-based projection engine 720 may include scrolling color 760 disposed proximate to output direction 728 to provide color display substantially to first and second light energies 726, 730.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

While the invention has been described in detail above, the invention is not intended to be limited to the specific embodiments as described. It is evident that those skilled in the art may now make numerous uses and modifications of and departures from the specific embodiments described herein without departing from the inventive concepts.

Obviously, numerous modifications and variations of the present invention are possible in light of the above teachings. It is therefore to be understood that the invention may be practiced otherwise than as specifically described herein.

What is claimed is:

1. A light pipe-based projection engine comprising:
a polarizing beam splitter receiving substantially un-polarized light at an input surface, the polarizing beam splitter transmitting first light energy of a useful polarization in an output direction and reflecting second light energy of a non-useful polarization in an recovery direction;

a wave plate disposed in said recovery direction to receive and modify the polarization of a substantial portion of the second light energy to said useful polarization;

a recovery reflector disposed reflectably to said recovery direction, said recovery reflector reflecting said second light energy in said output direction;

a modulator disposed in said output direction to modulate substantially said first light energy and said second light energy;

an initial light pipe disposed in said output direction to receive said first light energy from said polarization beam splitter and said second light energy from said recovery reflector and transmit said first and second light energies to said modulator;

a lens disposed proximate to said output direction to focus substantially said first and second light energies received from said modulator;

an output light pipe having an input surface disposed proximate to said output direction and an output surface, said output light pipe receiving said first and second light energies at said input surface from said lens and transmitting substantially said first and second light energies at said output surface; and a projection lens disposed in said output direction to collect and focus said first and second light energies from said output light pipe.

2. The light pipe-based projection engine of claim 1, comprising further:

an input light pipe having an input surface and an output surface, said output surface disposed proximate to said input face of said polarization beam splitter, said input light pipe receiving substantially un- polarized light at said input surface and transmitting said un-polarized light at said output surface to said polarizing beam splitter.

3. The light pipe-based projection engine of claim 1, comprising further:

a color wheel disposed proximate to said output direction to provide sequential color substantially to said first and second light energies.

4. The light pipe-based projection engine of claim 1, comprising further:

scrolling color disposed proximate to said output direction to provide color display substantially to said first and second light energies.

\* \* \* \* \*